United States Patent [19]
Nakamura et al.

[11] Patent Number: 6,151,464
[45] Date of Patent: Nov. 21, 2000

[54] IMAGE OUTPUT PROCESSING APPARATUS

[75] Inventors: Masakatsu Nakamura, Kashihara; Kimihito Yamasaki, Tenri; Yasuhiro Nakai, Kyoto; Syoichiro Yoshiura, Tenri; Tatsuo Nomura, Kyoto; Shunsuke Yajima, Yamatokoriyama, all of Japan

[73] Assignee: Sharp Kabushiki Kaisha, Osaka, Japan

[21] Appl. No.: 09/457,353

[22] Filed: Dec. 9, 1999

[30] Foreign Application Priority Data

Dec. 17, 1998 [JP] Japan .................................. 10-359679
Feb. 8, 1999 [JP] Japan .................................. 11-030144

[51] Int. Cl.[7] .......................... G03G 21/00; G06F 3/12; G01S 13/74; H04B 7/26
[52] U.S. Cl. ................................. 399/79; 399/81
[58] Field of Search ................. 399/79, 80, 81, 399/82, 83, 85, 87

[56] References Cited

U.S. PATENT DOCUMENTS 5,890,029 3/1999 Hirata et al. ..................... 399/80 X
5,911,095 6/1999 Atsumi et al. ..................... 399/80
5,959,530 9/1999 Lupien et al. ..................... 340/568.1

FOREIGN PATENT DOCUMENTS

B2-63-18911 4/1988 Japan .
5273338 10/1993 Japan .
10-16355 1/1998 Japan .

*Primary Examiner*—Richard Moses

[57] ABSTRACT

When a user approaches a digital copying machine, an ID card which the user is holding is detected (S1), and an ID number of the same is checked by communication between the ID card and the digital copying machine (S2). Print jobs corresponding to the detected ID number areb listed up (S4), and the print jobs corresponding to the ID number are outputted (S6). An order of output, timings of output, and a current state of output, of the print jobs can be displayed according to the ID number. Thus, an image output processing apparatus which is capable of controlling print jobs according to ID numbers is designed so as to execute various controls such as output processing control according to ID numbers, thereby to be an image output processing apparatus highly convenient for the users.

45 Claims, 16 Drawing Sheets

FIG. 6

PRINT JOB MANAGEMENT TABLE

| JOB NO | ID NO | DATE/TIME | INFORMATION | DATE/TIME |
|---|---|---|---|---|
| 1 | 0329 | 98/10/12 09:30 | A4  10 SHEETS  1 COPY  STAPLE | 98/10/12 09:31 |
| 2 | 0121 | 98/10/12 09:33 | A4  7 SHEETS  3 COPIES  STAPLE | — |
| 3 | 0121 | 98/10/12 09:34 | A4  7 SHEETS  3 COPIES  STAPLE | — |
| 4 | 0227 | 98/10/12 09:37 | B4  1 SHEET  2 COPIES  — | 98/10/12 09:37 |
| 5 | 0317 | 98/10/12 09:45 | B5  3 SHEETS  1 COPY  — | — |
| 6 | 0009 | 98/10/12 09:46 | A4  13 SHEETS  7 COPIES  STAPLE | — |
| 7 | 0317 | 98/10/12 09:52 | B5  1 SHEET  2 COPIES  — | — |
| 20 | 0009 | 98/10/12 10:30 | A4  15 SHEET  1 COPY  STAPLE | — |

F I G. 9
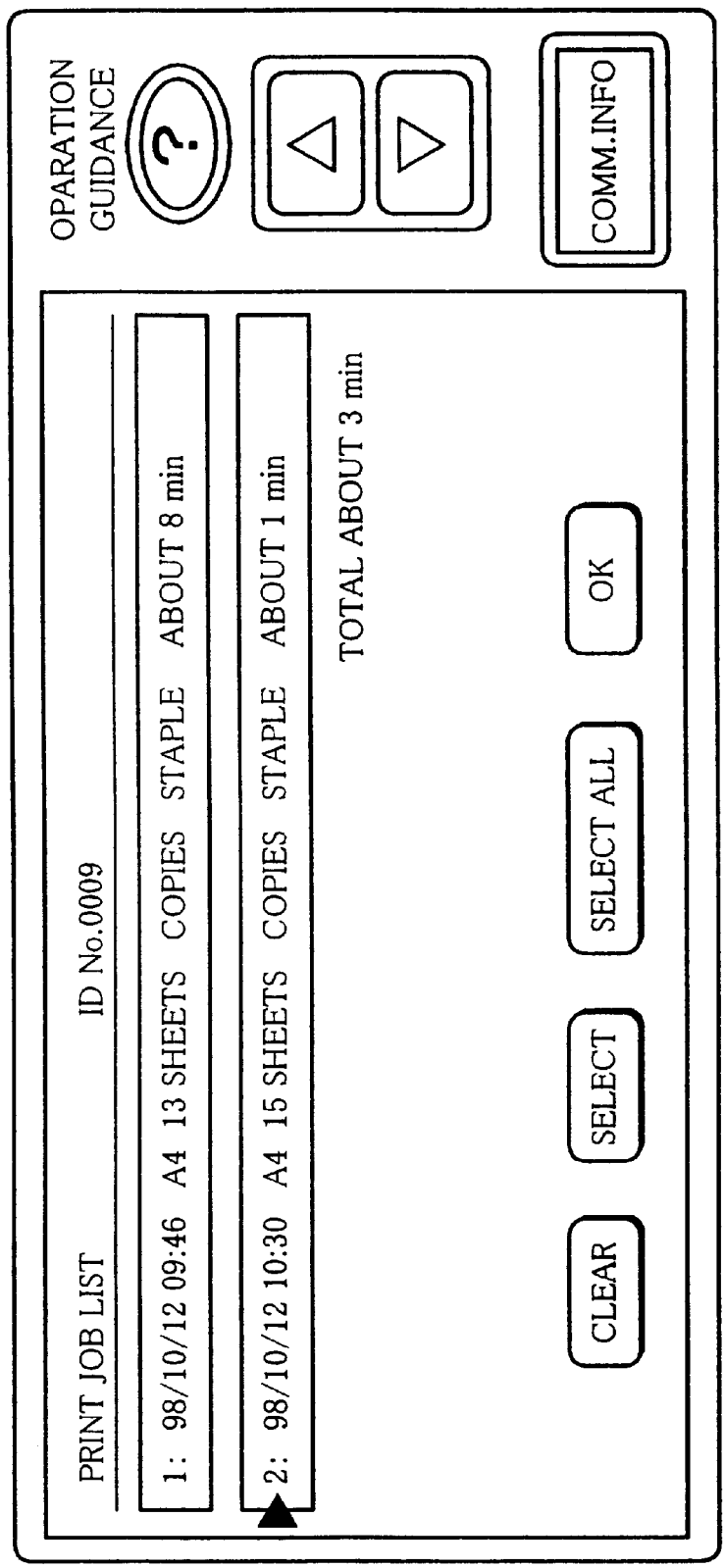

FIG. 12

JOB LIST

| No. | ID | SHEET | PROCESSING | RECEPCION |
|---|---|---|---|---|
| 001 | 0042 | A4 LANDSCAPE   10 SHEETS | 2 COPIES  STAPLE | 98,×,× 09:23 |
| 002 | 0103 | A4 LANDSCAPE   3 SHEETS | 5 COPIES  STAPLE | 98,×,× 09:30 |
| 003 | 0006 | B5 LANDSCAPE   15 SHEETS | 3 COPIES  STAPLE | 98,×,× 09:42 |
| 004 | 0042 | A3   1 SHEET | 1 COPY    — | 98,×,× 09:43 |
| 005 | 0029 | B4   5 SHEETS | 1 COPY    — | 98,×,× 09:47 |
| 006 | 0042 | A4 LANDSCAPE   17 SHEETS | 1 COPY    — | 98,×,× 09:50 |
| 007 | 0029 | A4 PORTRAIT   3 SHEETS | 2 COPIES  STAPLE | 98,×,× 09:58 |

FIG. 13

STATISTIC MANAGEMENT ID : 0042
AVERAGE TIME UNTIL OUTPUT STARTS : 4min 15sec

| No. | RECEPCION | OUTPUT START |
|---|---|---|
| 001 | 98,×,× 09:26 | 98,×,× 09:29 |
| 002 | 98,×,× 09:36 | 98,×,× 09:45 |
| 003 | 98,×,× 10:42 | 98,×,× 10:50 |
| 004 | 98,×,× 11:13 | 98,×,× 11:21 |
| 005 | 98,×,× 12:55 | 98,×,× 13:00 |

IMAGE OUTPUT PROCESSING APPARATUS

FIELD OF THE INVENTION

The present invention relates to an image output processing apparatus which (i) accepts a copy job in response to read-in of an original document by a scanner section and a print job instructed by an external apparatus such as a personal computer through a network communication device, (ii) outputs images corresponding to the foregoing jobs through an image output section, (iii) transmits, to an external apparatus, original document image information inputted trough the input section such as a scanner, and (iv) displays a state of a job in progress on a display section.

BACKGROUND OF THE INVENTION

Apparatuses that electronically read in document images, apply predetermined processing to the electronic image data thus read in, and then carry out optical scanning recording at electrophotographic recording sections based on the electronic image data so that images are recorded/reproduced have been put on the market as digital copying machines, for example.

Recently also marketed are copying machines which store electronically read-in image data in semiconductor memories and read out the image data stored in the semiconductor memories to form images on recording paper, and moreover, improve values of products thereof by adding characteristics unique to digital processing.

In the digital copying machine market, such copying machines have been proposed as systems capable of efficiently processing massive documents with increased capacity of semiconductor memories, or as complex digital machines in which functions of a facsimile, a printer, etc., are integrated.

To use such a digital copying machine to input massive document through a scanner section and process the same at once, or to receive and process massive document data produced by a personal computer or the like in a networked environment, the digital copying machine may be incapable of processing such input in some cases since the semiconductor memory installed therein has only a limited capacity of processing data at once.

To cope with this, recently has been devised installation of an external memory device with a large capacity, such as a hard disk device, so that the device works either by itself or along with a semiconductor memory to process image data of greater volume at once.

Furthermore, a recent digital copying machine is proposed as a device which does not only output image information through a printer section, but also operates in a scanner mode in which it reads image information of an original document with a scanner section installed therein and transmits the image information to an external apparatus such as a personal computer through a network communication device.

In the foregoing scanner mode, since the image information of the original document read in by the scanner section is to be transmitted to an external apparatus such as a personal computer, usually the image information is temporarily stored in a hard disk device or the like and is transmitted in response to a return request from an external apparatus.

Incidentally, in the foregoing arrangement, an output state of a digital copying machine, a printer, etc. in the network environment often appears such that recorded matters as outputs of print jobs instructed by various external apparatuses such as personal computers, various hand-held terminal devices, and facsimile machines are spread around an output section. Therefore, there arises a problem that it is difficult to find an output intended to obtain.

The Japanese Examined Patent Publication No. 18911/1988 (Tokukosho 63-18911) discloses a digital copying machine which is, to solve the foregoing problem, equipped with a sheet housing device having respective recorded matter housing spaces for the printer, facsimile, and copy modes so that the digital copying machine and the sheet housing device in combination serve as an output processing system.

With the foregoing digital copying machine, however, in the printer mode particularly, the user who instructs a print job instructs output of images to the output device but often forgets or has a delay to pick up the recorded matters, thereby causing a number of outputted matters to spread around the output section. Therefore, the foregoing digital copying machine does not completely solve the problem.

Besides, a conventional digital copying machine, when used in the scanner mode, requires the user to come to the digital copying machine and conduct many settings for performance in the scanner mode, including the instruction for switch to the scanner mode, a pass word for maintenance of secrecy, and a destination of transmission. This may increase possibility of making errors in the setting for the mode, thereby possibly obstructing smooth completion of an operation in the scanner mode.

On the other hand, the Japanese Publication for Laid-Open Patent Application No. 16355/1998 (Tokukaihei 10-16355) teaches an apparatus designed so that in response to an instruction for an image output operation (print job) from an external apparatus in the network environment, the print job is stored and managed along with an ID number, and the print job corresponding to the ID number is completed with output of images when an ID number of an ID card held by a user is identified with the ID number of the user who instructed the output operation. Since the foregoing apparatus does not permit start of output before the user comes thereto to take the outputted matter of the print job, the outputted matter intended to obtain can be obtained without being mixed in other outputted matters.

However, the device disclosed by Tokukaihei 10-16355 does not fully facilitate print job control by management of ID numbers, since, for example, output does not start before the user supposed to take the printed matter arrives there, thereby necessarily making the user wait. Further, application of the ID number management to the scanner mode is not disclosed at all.

Moreover, for example, in the copy mode for reading original document images with a scanner section and outputting read-in images, the foregoing digital copying machine often uses an automatic document feeder in the case where an original document is composed of a plurality of sheets of paper. In this case, the user only has to place the original document on the automatic document feeder, and sheets of the original document are automatically transported one by one to an original document platen of the scanner section, where images of the original document are read and copied. At the same time, a display section provided on an operation panel of the digital copying machine displays the number of sheets already copied or the number of sheets to be copied, by addition or subtraction, to show the user a state of progress of the copying operation.

In the case of the foregoing digital copying machine, however, wherein a copying operation is automatically executed following to start of the operation relating to the inputted job, the user sometimes leaves the digital copying machine after input of the job until completion of the job, particularly in the case where copied sheets to be obtained are a lot. Further, in the printer mode for outputting image data by printing with a networked external apparatus (personal computer, etc.), a user who inputted the image data does not necessarily come to pick up the printed matter promptly.

In the case where the user who inputted image data of the job is thus not at the machine, display of the state of the job in progress while the digital copying machine is executing the job is meaningless.

Furthermore, a recent digital copying machine is designed so that a scanner section for reading in original documents and a printer section for forming images on recording paper in accordance with image data can operate in parallel with respect to different image data, respectively. For example, while an image forming (image output) processing is executed in the printer section, the scanner section is available to conduct a read-in operation with respect to another document at the same time as long as the scanner section is open.

In such a digital copying machine, when, for example, the scanner section is open but the printer section is executing a printing operation, the display section displays a progress state of the printing operation. For the user to use the scanner section in this state, the user is required to switch the display to the setting screen with use of an interruption button or the like and then starts to operate the scanner section. If the user is not accustomed to such an operation of the digital copying machine, there arises a problem that this display of the progress state of the printing operation makes the user misinterpret that the machine is in use and the scanner section is not available, and he/she may wait until the end of the printing operation at the printing section, to use the scanner section.

SUMMARY OF THE INVENTION

An object of the present invention is to provide an image output processing apparatus which is capable of controlling print jobs according to ID numbers which are subjected to management, and which is further designed so as to be capable of executing various controls using the ID numbers, thereby to be further convenient for users.

To achieve the foregoing object, an image output processing apparatus of the present invention comprises (i) an image data input section for receiving image data supplied from an external apparatus, (ii) an image recording section for recording an image on a sheet of paper in accordance with the image data inputted through the image data input section, (iii) a storing and managing section for, upon input of image data through the image data input section, storing and managing the image data along with correspondence to a specific ID number, (iv) a traveling object identifying section having an interrogator provided in a main body of the image output processing apparatus, and a plurality of responders each of which stores a specific ID number and is capable of wireless communication with the interrogator within a control area of the interrogator, the traveling object identifying section being designed so that, when one of the responders enters the control area of the interrogator, the ID number stored in the responder is detected and checked by the interrogator, and (v) a display section for, when an ID number is detected by the traveling object identifying device, in the case where image data corresponding to the ID number are stored in the storing and managing section, displaying information about the image data, and the image output processing apparatus is characterized in that the display section displays at least an output processing time of the image data as the information about the image data.

In the foregoing image output processing apparatus, upon input of image data from an external apparatus to the foregoing image output processing apparatus, the image data are stored in the storing and managing apparatus in a state in which the image data are made to correspond to a specific ID number. Here, assume that the foregoing ID number is a number specifically imparted to a user having sent the image data, and that each user at any time has with him/herself a responder of the traveling object identifying section storing his/her own ID number, and when the user approaches the copying machine, the ID number is detected by the interrogator of the traveling object identifying section. If image data corresponding to the detected ID number are stored in the storing and managing section, information about the image data is displayed on the display section. Here, at least an output processing time of the image data (an estimated time at which the print job finishes) is displayed as the information about the image data. As information about the image data displayed on the display section, apart from the output processing time, information about print jobs (reception time, size, number of sheets, etc.), information about output of the print jobs (processing time, etc.), and the like may be displayed as well.

This enables the user to check the contents of the print jobs he/she has requested, only by coming to the image output processing apparatus. Specifically, when the user comes to the image output processing apparatus, the user can check the output processing time to take it into consideration when determining the time when he/she would come back after start of the printing to pick up the outputted matter. In this case, since contents of print jobs other than those which the ID-number-detected user has requested are not displayed, the displayed contents are easy for the user to understand.

An image output processing apparatus of the present invention comprises (i) an image data input section for receiving image data supplied from an external apparatus, (ii) an image recording section for recording an image on a sheet of paper in accordance with the image data inputted through the image data input section, (iii) a storing and managing section for, upon input of image data through the image data input section, storing and managing the image data along with correspondence to a specific ID number, and (iv) a traveling object identifying section having an interrogator provided in a main body of the image output processing apparatus, and a plurality of responders each of which stores a specific ID number and is capable of wireless communication with the interrogator within a control area of the interrogator, the traveling object identifying section being designed so that, when one of the responders enters the control area of the interrogator, the ID number stored in the responder is detected and checked by the interrogator, (v) a lapse of time managing section for, regarding each set of image data supplied from an external apparatus, managing a lapse of time since input of the image data, and (vi) an output control section for controlling output of image data stored in the storing and managing section, and the image output processing apparatus of the present invention is characterized in that when an ID number is detected by the traveling object identifying device, in the case where a plurality of sets of image data corresponding to the ID number are stored in the recording and managing section, the output is controlled on the basis of lapses of time of the sets of image data managed by the lapse of time managing section.

In the foregoing image output processing apparatus, in the case where a plurality of sets of image data corresponding to the ID number detected by the traveling object identifying section are stored in the storing and managing section, the plural sets of image data are outputted by the output control section in a predetermined order, on the basis of lapses of time of the sets of image data managed by the lapse of time managing section. This enables efficient output processing of image data which the user would need.

An image output processing apparatus of the present invention comprises (i) an image data input section for receiving image data supplied from an external apparatus, (ii) an image recording section for recording an image on a sheet of paper in accordance with the image data inputted through the image data input section, (iii) a storing and managing section for, upon input of image data through the image data input section, storing and managing the image data along with correspondence to a specific ID number, (iv) a traveling object identifying section having an interrogator provided in a main body of the image output processing apparatus, and a plurality of responders each of which stores a specific ID number and is capable of wireless communication with the interrogator within a control area of the interrogator, the traveling object identifying section being designed so that, when one of the responders enters the control area of the interrogator, the ID number stored in the responder is detected and checked by the interrogator, and (v) an output control section for, when an ID number is detected by the traveling object identifying device, in the case where image data corresponding to the ID number are stored in the recording and managing section, controlling output of image data stored and managed by the storing and managing section, and the image output processing apparatus is characterized in that, in the case where during an output of image data another ID number is detected by the traveling object identifying device, the output control section prepares output of image data corresponding to the newly detected ID number, in parallel with the current output operation.

In the foregoing image output processing apparatus, in the case where a new ID number is detected during an outputting operation of certain image data, preparation for output of a print job corresponding the newly detected ID number is carried out, while the currently executed image data output processing operation is promoted. Here, the preparation for output includes, for example, development of image data which are temporarily stored in the storing and managing section, the preliminary checking of presence/ absence of sheets of recording paper, preliminary checking of presence/absence of staples in a post-processing device (stapler), etc., and this aims at smooth shift to output of the new print job after completion of the current print job output. As a result, completion of the current image data output processing operation is followed, without cessation (efficiently), by an output processing operation of image data corresponding to the newly detected ID number.

An image output processing apparatus of the present invention comprises (i) an image data input section for receiving image data supplied from an external apparatus, (ii) an image recording section for recording an image on a sheet of paper in accordance with the image data inputted through the image data input section, (iii) a storing and managing section for, upon input of image data through the image data input section, storing and managing the image data along with correspondence to a specific ID number, (iv) a traveling object identifying section having an interrogator provided in a main body of the image output processing apparatus, and a plurality of responders each of which stores a specific ID number and is capable of wireless communication with the interrogator within a control area of the interrogator, the traveling object identifying section being designed so that, when one of the responders enters the control area of the interrogator, the ID number stored in the responder is detected and checked by the interrogator, and (v) an output control section for, when an ID number is detected by the traveling object identifying device, in the case where image data corresponding to the ID number are stored in the recording and managing section, controlling output of image data stored and managed by the storing and managing section, and the image output processing apparatus is characterized in (a) that the image output processing apparatus has at least one operation mode, in addition to a printer mode for receiving image data supplied from an external apparatus and outputting an image on a sheet of paper based on the image data, and (b) that, in the case where, before output of image data in the printer mode is started, an instruction relating to a processing operation in another mode is detected, the output control section temporarily suspends the output of image data in the printer mode and prioritizes the output processing operation in the other mode instructed.

In the foregoing image output processing apparatus, a user's ID number is detected as the user approaches the image output processing apparatus, and in the case where image data corresponding to the ID number are stored in the storing and managing section, the image output processing apparatus shifts to the printer mode so as to output the image data.

In this case, however, the user may in some cases want to use the image output processing apparatus in another mode, for example, in the copy mode or in the FAX mode. Therefore, in the case where an instruction for an output processing operation in another operation mode by the time when output of the image data corresponding to the ID number detected starts, the output of the image data in the printer mode is temporarily suspended, and the output processing operation in the instructed operation mode is prioritized, thereby ensuring that the image output processing apparatus is operated in a state desired by the user.

An image output processing apparatus of the present invention comprises (i) an image data input section for receiving image data supplied from an external apparatus, (ii) an image recording section for recording an image on a sheet of paper in accordance with the image data inputted through the image data input section, (iii) a storing and managing section for, upon input of image data through the image data input section, storing and managing the image data along with correspondence to a specific ID number, (iv) a traveling object identifying section having an interrogator provided in a main body of the image output processing apparatus, and a plurality of responders each of which stores a specific ID number and is capable of wireless communication with the interrogator within a control area of the interrogator, the traveling object identifying section being designed so that, when one of the responders enters the control area of the interrogator, the ID number stored in the responder is detected and checked by the interrogator, (v) a statistics information managing section for statistically managing a picking-up period since reception of image data until detection of an ID number corresponding to the image data by the traveling object identifying section, and managing an average of picking-up periods as an average picking-up period regarding each ID number, and (iv) an output control section for controlling output of image data based on average picking-up periods stored in the statistics information managing section when a quantity of data stored in the storing and managing section reaches a predetermined level.

In the foregoing image output processing apparatus, picking-up periods after output are statistically managed by the statistics information managing section regarding each ID number (i.e., each user), and in the case where a plurality of sets of image data are to be outputted, the order in which the sets of image data are outputted is controlled on the basis of the average picking-up periods. As a result, a plurality of sets of image data are efficiently outputted in an appropriate order, without being temporarily suspended.

Incidentally, an example of the state in which a plurality of image data are to be outputted is a state in which a plurality of ID numbers are simultaneously detected, and an example of a method of controlling the output order is a method in which the image data corresponding to an ID number with a shorter average picking-up period are prioritized in outputting.

An image output processing apparatus of the present invention comprises (i) an image data input section for receiving image data supplied from an external apparatus, (ii) an image recording section for recording an image on a sheet of paper in accordance with image data inputted through the image data input section, (iii) a storing and managing section for, upon input of image data through the image data input section, storing and managing the image data along with correspondence to a specific ID number, (iv) a traveling object identifying section having an interrogator provided in a main body of the image output processing apparatus, and a plurality of responders each of which stores a specific ID number and is capable of wireless communication with the interrogator within a control area of the interrogator, the traveling object identifying section being designed so that, when one of the responders enters the control area of the interrogator, the ID number stored in the responder is detected and checked by the interrogator, (v) a statistics information managing section for statistically managing a picking-up period since reception of image data until detection of an ID number corresponding to the image data by the traveling object identifying section, and managing an average picking-up period as an average of picking-up periods regarding each ID number, as well as an estimated picking-up time regarding each ID number, the estimated picking-up time being calculated by adding, to an input time of inputted image data, an average picking-up period corresponding to the inputted image data, and (vi) an output control section for controlling a timing of output of image data based on the estimated picking-up time managed by the statistics information managing section.

In the foregoing image output processing apparatus, picking-up periods after output are statistically managed by the statistics information managing section regarding each ID number (i.e., each user), and past picking-up periods upon outputting are statistically managed so that an image data output timing is controlled on the basis of an estimated picking-up time. As a result, image data are efficiently outputted at an appropriate timing.

Furthermore, by controlling an image data output timing according to an estimated picking-up time at which the user is expected to come to pick up the outputted matter, a period of time since output of the image data until the time when the user comes to pick up the outputted matter can be shortened. As a result, problems like that outputted matters from the apparatus fill the output section, mixed up with each other with distinction therebetween becoming difficult, making it difficult to find out a target outputted matter, can be avoided.

An image output processing apparatus of the present invention comprises (i) a reading section for reading in an original document to obtain image data of the same, (ii) a transmitting section for transmitting the image data obtained by the reading section, to an external apparatus, (iii) a traveling object identifying section having an interrogator provided in a main body of the image output processing apparatus, and a plurality of responders each of which stores a specific ID number and is capable of wireless communication with the interrogator within a control area of the interrogator, the traveling object identifying section being designed so that, when one of the responders enters the control area of the interrogator, the ID number stored in the responder is detected and checked by the interrogator, (iv) a storing and managing section for, upon reading of an original document by the reading section, storing and managing image data obtained through the reading, and an ID number detected by the traveling object identifying section, along with correspondence therebetween, and (v) a transmission control section for, in transmitting the image data obtained by the reading section to an external apparatus, controlling transmission of the image data according to the ID number stored and managed by the storing and managing section.

In the foregoing image output processing apparatus, upon read-in of an original document by the reading section, the traveling object identifying section detects the user's ID number who has the original document read in, from a responder (for example, an ID card) which the user holds with him/herself. Here, the image data read in by the reading section and the ID number detected by the traveling object identifying section are stored in the storing and managing section along with the correspondence therebetween, and the transmission control section executes transmission control according to the ID number detected by the foregoing traveling object identifying section. Thus, since a transmission processing operation of image data of an original document read in is automatically judged and executed, operability for the user is enhanced.

An image output processing apparatus of the present invention comprises (i) an image data input section for receiving image data supplied from an external apparatus, (ii) an image recording section for recording an image on a sheet of paper in accordance with image data inputted through said image data input section, (iii) a storing and managing section for, upon input of image data through said image data input section, storing and managing the image data along with correspondence to a specific ID number, (iv) a traveling object identifying section having an interrogator provided in a main body of said image output processing apparatus, and a plurality of responders each of which stores a specific ID number and is capable of wireless communication with said interrogator within a control area of said interrogator, said traveling object identifying section being designed so that, when one of said responders enters the control area of said interrogator, the ID number stored in said responder is detected and checked by said interrogator, (iv) a display section for displaying information about the image data, wherein when an ID number is detected by said traveling object identifying device, in the case where image data corresponding to the ID number are stored in said recording and managing section, said display section displays information about the image data, and (v) a display control section for controlling a display state of said display section in accordance with a result of the ID number checking by said traveling object identifying section, and the image output processing apparatus is characterized in that when presence of the ID number becomes no longer detected by said traveling object identifying section during recording of image data by said image recording section, said display control section switches the display state of said display section into a state of displaying permission of input of new image data.

In the foregoing image output processing apparatus, when the user having inputted image data has gone away from the apparatus and his/her ID number has become no longer detected by the traveling object identifying device, even while the image data output processing operation is being executed by the image recording section, the display of the display section is switched into a state of telling that input of new image data is permitted. As a result, unnecessary display is not executed, and input is carried out, without an inconvenience like that another user, seeing a display telling that a printing operation is executed, misunderstands that the apparatus is currently unavailable and waits for the apparatus becoming available for input.

For a fuller understanding of the nature and advantages of the invention, reference should be made to the ensuing detailed description taken in conjunction with the accompanying drawings.

BRIEF DESCRIPTION OF THE DRAWINGS

FIG. 6 is an explanatory view illustrating a management table of print jobs stored in a hard disk device of the foregoing digital copying machine.

FIG. 9 is an explanatory view illustrating an example of a display screen showing guidance to a user, which turns up when the user's ID card is detected.

FIG. 12 is an explanatory view illustrating a job list listing up all print jobs managed by a digital copying machine in accordance with Example 5.

FIG. 13 is an explanatory view illustrating a job list displayed by the foregoing digital copying machine, which lists up all jobs relating to a specific user.

DESCRIPTION OF THE PREFERRED EMBODIMENTS

The following description will explain an embodiment of the present invention.

An embodiment of an image output processing apparatus in accordance with the present invention is explained below by taking as an example a digital copying machine which is connected with an external information processing device such as a personal computer through network, or with a digital video camera, a facsimile machine, etc.

Figure 2:
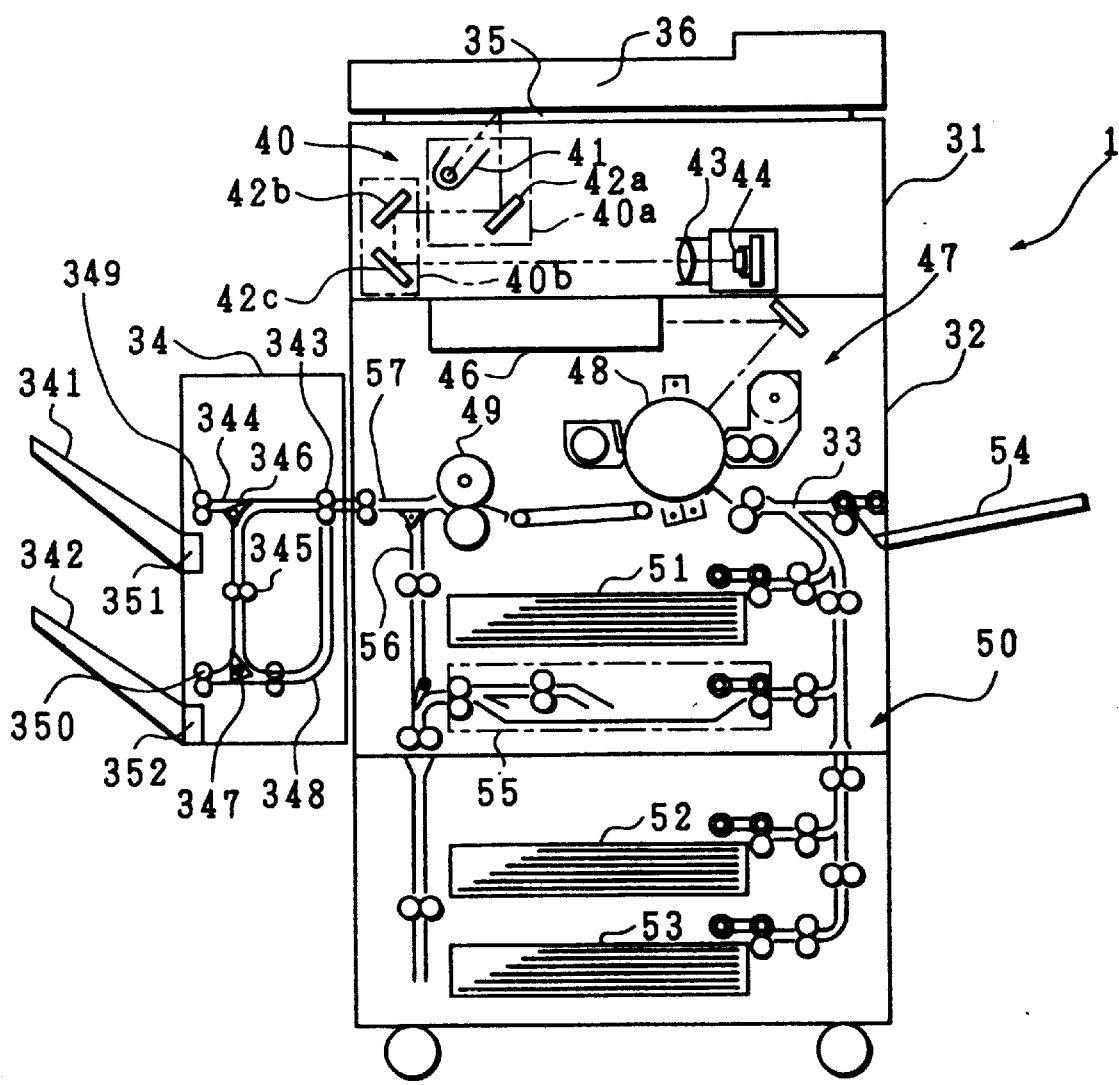
FIG. 2 is a cross-sectional view illustrating an arrangement of a digital copying machine in accordance with the present invention.

FIG. 2 is a cross-sectional view illustrating an entire structure of a digital copying machine 1. As shown in this figure, the digital copying machine 1 is mainly composed of a scanner section 31 and a laser recording section (image recording section) 32.

The scanner section 31 is composed of an original document platen 35 made of transparent glass, a recirculating automatic document feeder (RADF) 36 for automatically feeding an original document onto the original document platen 35, and an original document read-in unit for scanning and reading in an image on the original document placed on the original document platen 35, that is, a scanner unit 40.

An original document image read in by the scanner section 31 is sent to an image data input section which will be described later, in a form of image data, to which a predetermined image processing is applied.

The RADF 36 is a device for feeding a document which is composed of a plurality of sheets of paper and set on a predetermined original document tray, sheet by sheet onto the original document platen 35 of the scanner unit 40 automatically. The RADF 36 is composed of a transport path for a one-sided document, a transport path for a double-sided document, transport path switching means, etc., so as to have either surfaces on one side of the document or surfaces on both sides of the document read by the scanner unit 40, according to selection of an operator. Incidentally, detailed description of the RADF 36 is omitted herein since many patent applications and commercialization of the same have been made.

The scanner unit 40 is composed of a lamp reflector assembly 41, a first scanning unit 40a, a second scanning unit 40b, an optical lens body 43, and a photoelectric converting element 44. The lamp reflector assembly 41 is designed to irradiate a surface of an original document. The first scanning unit 40a is composed of a first reflection mirror 42a which is designed to guide a reflected-light image of the original document to the photoelectric converting element 44. The second scanning unit 40b is composed of second and third reflection mirrors 42b and 42c which are designed to further guide the reflected-light image of the original document to the photoelectric converting element 44. The optical lens body 43 is designed to create an image on the photoelectric converting element 44 which converts the reflected-light image of the original document into electric image signals. The photoelectric converting element 44 is composed of a CCD or the like which converts the reflected-light image from the original document into electric image signals.

The scanner section 31 is arranged so as to read the original document image with use of the RADF 36 and scanner unit 40 which act in an associated manner wherein an original document to be read is placed on the original document platen 35 sheet by sheet sequentially while the scanner unit 40 is moved along a lower surface of the original document platen 35.

Image data obtained by reading the original document image by use of the scanner unit 40 are sent to an image processing section which will be described afterwards, and are supplied to a laser scanning unit (hereinafter referred to as LSU) 46 of the laser recording section 32, after being subjected to various processing operations.

The laser recording section 32 is equipped with a sheet housing and transporting section, the LSU 46, and an electrophotographic processing unit 47 for forming an image.

The sheet housing and transporting section has a first cassette 51, a second cassette 52, a third cassette 53, and a multiple hand-feed tray 54, and further, a duplex unit 55 for recording an image on a back surface of a sheet on whose front surface an image has already been recorded.

Each of the foregoing cassettes of the sheet housing and transporting section houses sheets of recording paper according to sizes, and when a cassette which houses sheets in a size desired by the operator is selected, the sheets housed therein are sent out by a transportation section 50 sequentially sheet by sheet from the top sheet in the cassette. The sheet sent out is transported via a transport path 33 to the electrophotographic processing section 47 of the laser recording section 32.

The LSU 46 has a semiconductor laser for emitting laser light in accordance with image data from the foregoing memory, a polygon mirror for constant angular velocity deflection with respect to the laser light, and an f-θ lens for adjusting the light which has been thus deflected at a constant angular velocity so that the light is deflect at a constant angular velocity on a photosensitive drum 48 of the electrophotographic processing section 47.

The electrophotographic processing section 47 is equipped with a charger, a developer, a transfer unit, a separating unit, a cleaner, and a discharger around the photosensitive drum 48, in a known manner, as well as a fixing unit 49 on a downstream side in the sheet transport direction.

Further, on a downstream side to the fixing unit 49 in the sheet transport direction, a sheet discharge transport path is provided, from which branch off a transport path 57 leading to the post-processing device 34 and a transport path 56 leading to the duplex unit 55.

In accordance with the image data read from the image memory, an electrostatic latent image is formed on the photosensitive drum 48 by causing the laser light to scan a surface of the photosensitive drum 48 under control of the LSU 46, and is visualized with use of toner. The toner image thus obtained is then electrostatically transferred and fixed onto a surface of a sheet transported by the sheet housing and transporting section.

The sheet on which an image is thus formed is transported from the fixing unit 49, selectively either to the post-processing device 34 via the transport path 57, or otherwise to the duplex unit 55 via the transport path 56.

The post-processing device 34 has a first discharge tray 341 and a second discharge tray 342, which are vertically arranged in a left-side part of the device and receive, from the transport path 57, the sheet on which an image is recorded by the digital copying machine 1. In the post-processing device 34, a sheet receiving opening 343, a first transport path 344, a second transport path 345, a first switching gate 346, a second switching gate 347, a switch-back transport path 348, first discharge rollers 349, second discharge rollers 350, and the like are provided, so as to operate according to various discharge modes.

In a first discharge mode, a sheet received at the sheet receiving opening 343 is sent along the first transport path 344 directly onto the first discharge tray 341 through the first discharge rollers 349.

In a second discharge mode, a sheet received at the sheet receiving opening 343 is guided by the first switching gate 346 to the second transport path 345, then guided by the second switching gate 347 to the second discharge rollers 350 side, and discharged through the second discharge rollers 350 onto the second discharge tray 342.

In a third discharge mode, a sheet received at the sheet receiving opening 343 is guided by the first switching gate 346 to the second transport path 345, then guided by the second switching gate 347 to the switchback transport path 348. When a rear end of the sheet passes the second switching gate 347, the sheet is switched back, then guided by the second switching gate 347 to the second discharge rollers 350, and discharged by the second discharge rollers 350 onto the second discharge tray 342.

Conventionally known offset systems 351 and 352 are provided at the first discharge tray 341 and the second discharge tray 342, respectively. The offset systems 351 and 352 are designed each to displace a set of discharged sheets from another set in a direction substantially orthogonal to the discharge direction, so that sheets with images recorded thereon are housed in a state of being grouped per job or per mode. The post-processing device 34 further includes a stapling section (not shown), etc.

Figure 3:
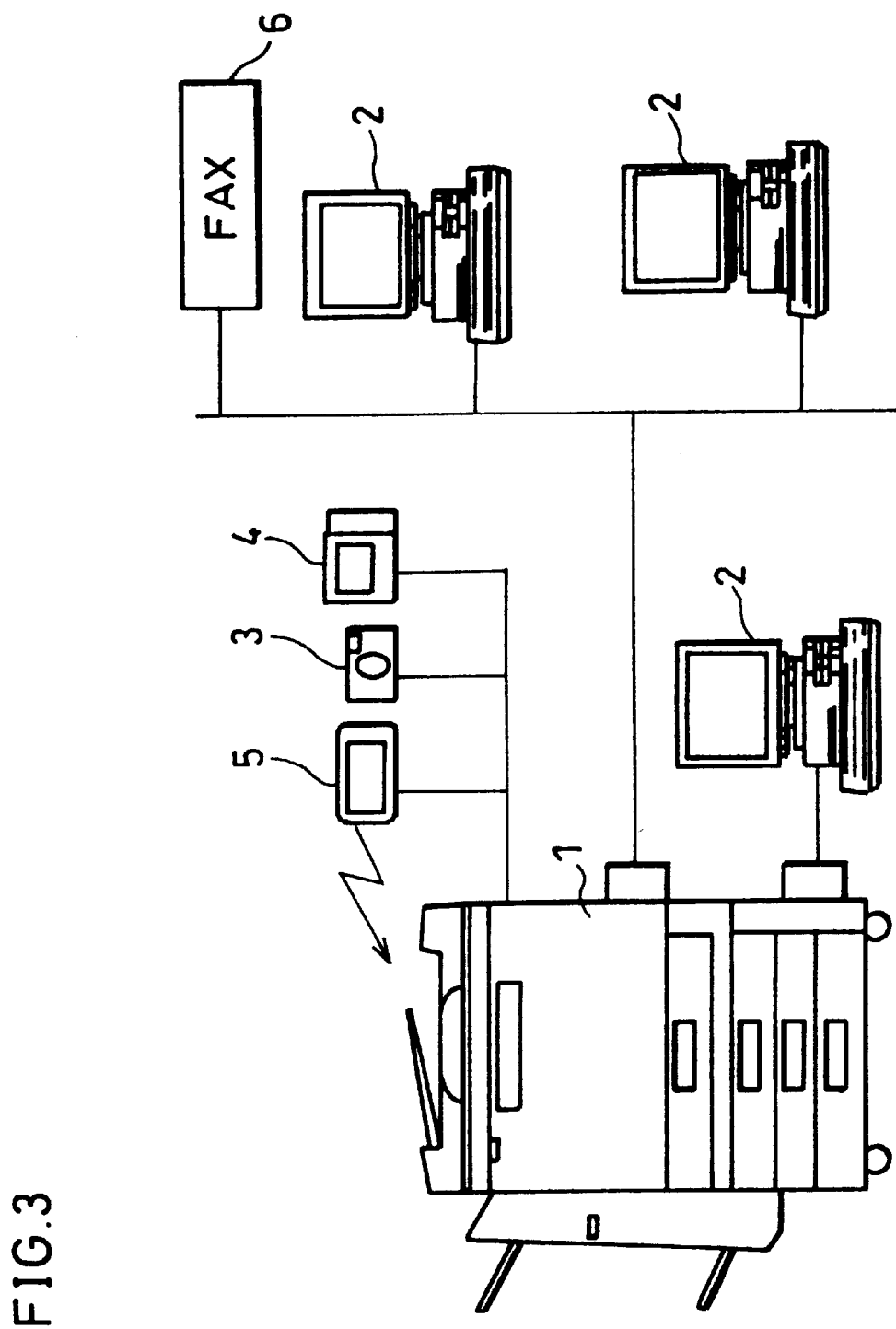
FIG. 3 is an explanatory view illustrating a network environment to which the foregoing digital copying machine is connected.

FIG. 3 shows an environment in which the digital copying machine 1 is connected through network with external image processing devices, for example, a personal computer 2, a digital camera 3, a digital video camera 4, a hand-held terminal unit 5, and a facsimile machine 6.

Image data transferred through an interface from the image processing device thus connected through network are once sent to an image processing section of the digital copying machine 1, and after a predetermined processing is applied thereto, an image based on the data is recorded, reproduced, and outputted from the laser recording section 32.

Next, a configuration and functions of the image processing section for applying image processing to the read original document image information, in the digital copying machine 1.

Figure 4:
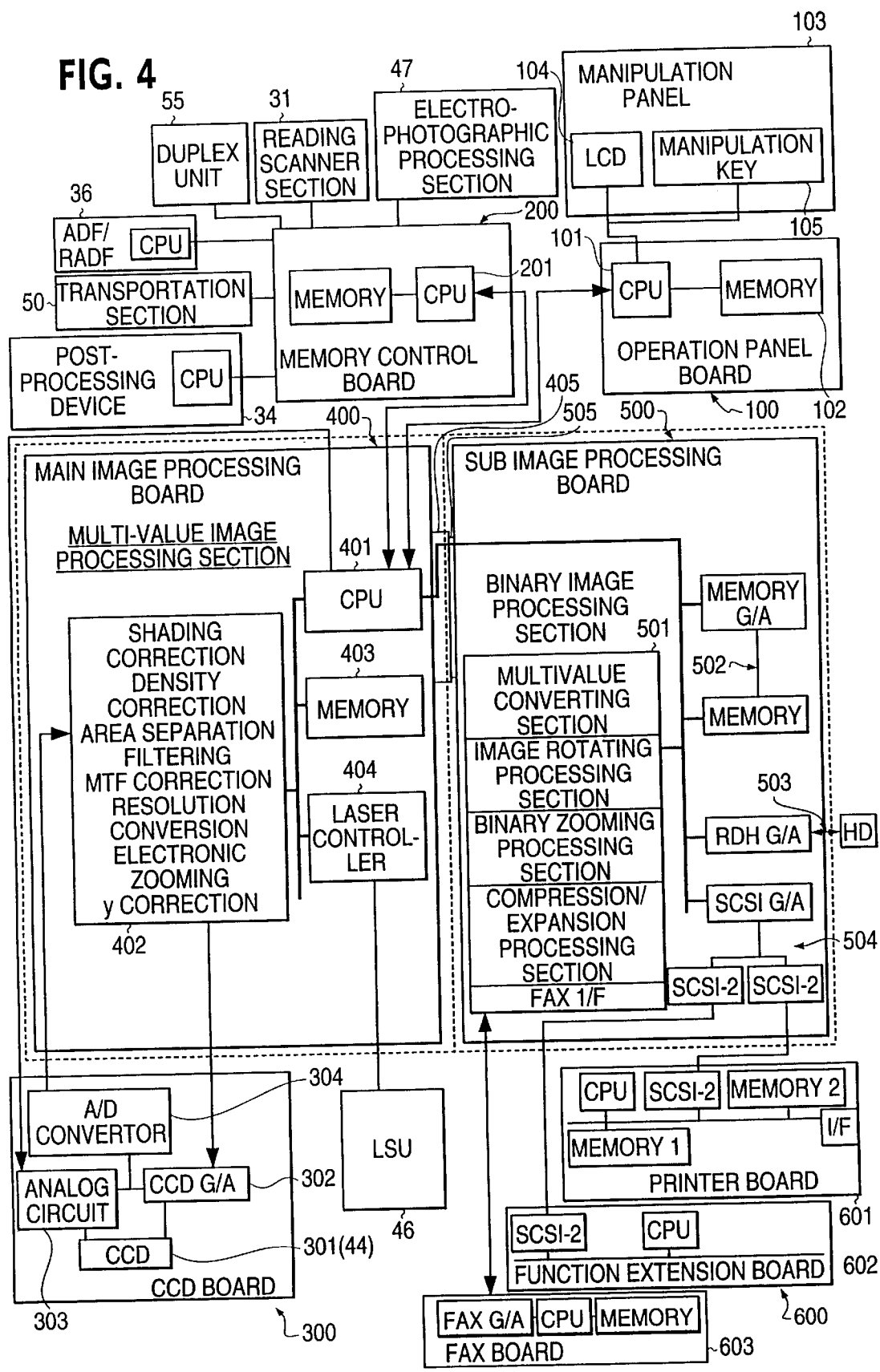
FIG. 4 is a block diagram illustrating a circuitry of an image processing section provided in the foregoing digital copying machine.

FIG. 4 illustrates a configuration of an entire block including component units, the image processing section, etc. constituting the digital copying machine 1. Operations of the digital copying machine 1 are controlled by a main central processing unit (CPU) 401, and sub CPUs which are respectively installed in the units and control the units in association with the main CPU 401.

As clear from the foregoing block diagram of FIG. 4, the digital copying machine 1 is roughly composed of an operation panel board 100, a machine control board 200, a CCD board 300, a main image processing board 400, a sub image processing board 500, an extension board group 600, etc.

The operation panel board 100 manages and controls a manipulation panel. The machine control board 200 manages and controls each unit constituting the digital copying machine 1. The CCD board 300 electrically reads an original document image and converts it into electronic data. The main image processing board 400 applies predetermined image processing to the original document image which has been converted into the electronic data by the CCD board 300. The sub image processing board 500 further applies predetermined image processing to the image information processed by the main image processing board 400. The extension board group 600 (printer board, facsimile (FAX) board, function extension board) is connected through interface with the sub image processing board 500.

The following description will depict respective contents managed and controlled by the foregoing boards.

The operation panel board 100, basically controlled by a sub central processing unit (CPU) 101, manages operation input through a display screen of an LCD display section 104 provided on a manipulation panel 103, and a manipulation key group 105 for inputting instructions regarding the modes.

The operation panel board 100 is also provided with a memory 102 for storing control information of various kinds inputted through the manipulation panel 103, including data inputted through the manipulation key group 105 and information to be displayed on the LCD display section 104.

In this arrangement, the sub CPU 101 communicates control data with the main CPU 401, so as to instruct operations of the digital copying machine 1. From the main CPU 401, control signals indicating operation states of the digital copying machine 1 are transmitted to the sub CPU 101, so that the current state of the device is displayed to the operator through the LCD display section 104 of the manipulation panel 103.

The entire machine control board 200 is controlled by the sub CPU 201, so as to manage a document feeder 36 as above described, such as an automatic document feeder (ADF) or a recirculating automatic document feeder (RADF), the scanner section 31 for reading an original document image, the electrophotographic processing section 47 for reproducing image information into images, the sheet transportation section 50 for feeding out, from cassettes, sheets of recording paper on which images are to be recorded and sequentially transporting the same one by one to the electrophotographic processing section 47, the duplex unit 55 for recirculating a sheet so that images are formed on both sides, the post-processing device 34 for applying post-processing such as stapling to sheets with images recorded thereon, etc. Further, an ID card detecting section 201 which will be described afterwards is also controlled by the machine control board 200.

The CCD board 300 is composed of a CCD 301 for electrically reading original document images, a circuit (CCD gate array) 302 for driving the CCD 301, an analog circuit 303 for adjusting a gain for analog data outputted from the CCD 301, an A/D converter 304 for converting an analog output of the CCD 301 into digital signals and outputting the same as electronic data, and the like. The CCD board 300 is controlled by the main CPU 401.

The main image processing board 400, controlled by the main CPU 401, is composed of a multivalue image processing section 402, a memory 403, a laser controller 404, and the like. Based on electronic data of the original document images transmitted from the CCD board 300, in order that the gray levels of the images can be reproduced in desired conditions, the multivalue image processing section 402 applies processing operations such as shading correction, density correction, area separation, filtering, MTF (modulation transfer function) correction, resolution change, electronic zooming (variable magnification), and γ correction, with respect to image data which remain multi-valued. The memory 403 stores processed image data, various control information such as information regarding processing procedure control, and other information. The laser controller 404 controls and transfers image data to the LSU 46 so that images are reproduced with use of the processed image information.

The sub image processing board 500 is connected with the main image processing board 400 via connectors. The sub image processing board 500 is composed of a binary image processing section 501, a memory section 502, a hard disk device 503, an interface section 504, and the like. The memory section 502 is composed of a memory for storing and managing processed binary image information and control information for image processing, as well as a gate array for controlling the memory. The hard disk device 503 is composed of (i) a disk memory for storing original document image information equivalent to images on a plurality of sheets, and allowing original document image information for a plurality of sheets to be read out repeatedly a desired number of times so as to produce the desired number of copies, and (ii) gate arrays for controlling the disk memory. The interface section 504 is composed of an SCSI as an external interface and a gate array for controlling the SCSI. These component parts of the sub image processing board 500 are controlled by the main CPU 401 on the main image processing board 400.

Further, the binary image processing section 501 is composed of a processing part for converting multivalue image information into a binary image, a processing part for rotating an image, a binary variable magnification (zooming) processing part, and the like. The binary image processing section 501 is further equipped with a facsimile interface so as to transmit/receive facsimile images through a communication section.

The extension board group 600 includes a printer board 601, a function extension board 602, a facsimile (FAX) board 603, and the like. The printer board 601 makes it possible that image data supplied from the personal computer 2 and the like are outputted in the printer mode from the laser recording section 32 of the digital copying machine 1. The function extension board 602 extends editing functions of the digital copying machine 1 so that the characteristics of the digital copying machine 1 are fully utilized. The FAX board 603 makes it possible that original document images read in through the scanner section 31 of the digital copying machine 1 are sent to the other party of communication, and that image information transmitted from the other party is outputted by the laser recording section 32 of the digital copying machine 1. The printer board 601 is equipped with an I/F for receiving data sent from the personal computer 2 or the like and transmitting original document image data read in by the scanner to the personal computer 2 or the like, and the I/F is equivalent to an image data input section and a transmitting section set forth in claims.

The following description will explain, in more detail, respective image data processing operations and image data flows in respective image processing modes of the digital copying machine 1, i.e., the copy mode, the facsimile mode, and the printer mode.

[Copy Mode]

An original document set at a predetermined position on the RADF 36 of the digital copying machine 1 is supplied onto the original document platen 35 of the scanner section 31 sheet by sheet sequentially, and images of the original document are sequentially read by the scanner unit 40 designed as described above, and are transferred to the main image processing board 400 in an 8-bit electronic image data form. Note that, to make the original document read in, the user may manually set the same on the original document platen 35 sheet by sheet.

The 8-bit electronic data thus transferred to the main image processing board 400 are, as 8-bit electronic image data, subjected to a predetermined processing operation on the multivalue image processing section 402. Then, a processing operation such as $\gamma$ correction is applied to the 8-bit electronic image data, and the processed data are sent to the LSU 46 via the laser controller 404.

Through this process, the original document image read by the scanner section 31 of the digital copying machine 1 are outputted as a copied image in gray scale from the laser recording section 32.

[Electronic RDH (Recycle Document Handler) Function in Copy Mode]

Likewise, the original document set at a predetermined position on the RADF 36 of the digital copying machine 1 is supplied onto the original document platen 35 of the scanner section 31 sheet by sheet sequentially, and images on the original document are sequentially read by the scanner unit 40 arranged as described above, and are transferred to the main image processing board 400 in the 8-bit electronic data form. The 8-bit electronic data thus transferred to the main image processing board 400 are, as 8-bit electronic image data, subjected to a predetermined processing operation on the multivalue image processing section 402.

The 8-bit electronic image data are subsequently sent to the sub image processing board 500 through the connector 405 on the main image processing board 400 and the connector 505 on the sub image processing board 500. The 8-bit electronic image data thus sent to the sub image processing board 500 are subjected to error diffusion or the like and conversion from the 8-bit electronic image data to 2-bit electronic image data at the multivalue converting section of the binary image processing section 501.

Incidentally, the conversion of 8-bit electronic image data into 2-bit electronic image data in addition to other processing such as the error diffusion aims to avoid deterioration of image quality. This is because satisfactory image quality is not obtained by simple multivalue-to-binary conversion in some cases. The conversion of 8-bit electronic image data into 2-bit electronic image data is also a result of consideration to image memory capacity.

The 2-bit electronic image data thus obtained through conversion are transferred to the disk memory of the hard disk device 503, data equivalent to one page at once, and are temporarily stored therein. When all the data of the original document set on the RADF 36 of the digital copying machine 1 are read, the 2-bit electronic image data temporarily stored in the disk memory are read out repeatedly a set number of times which corresponds to the number of required copies to be produced, under control of the gate array. The read-out 2-bit electronic image data are again sent through the connectors 405 and 505 to the main image processing board 400, where the image data are subjected to $\gamma$ correction and the like. Then, the processed data are sent to the LSU 46 via the laser controller 404.

Incidentally, in the above description, it is explained that after all the images of all the original document are read, the images are read out repeatedly a number of times which corresponds to the number of required copies to be produced, but the present invention is not limited to this. Instead, the image output for the first copy may be started whenever a set quantity of images becomes ready.

Through this process, the original document image read by the scanner section 31 of the digital copying machine 1 are outputted as a copied image in gray scale from the laser recording section 32.

[Printer Mode]

Images transmitted from a networked external information processing device such as the personal computer 2 or the digital camera 3 shown in FIG. 3 are developed on the printer board 601 into images divided into page units, and are temporarily transferred from the SCSI constituting the interface section 504 to the sub image processing board 500, then to memory such as the hard disk device 503.

To briefly explain flow of this process by taking the personal computer 2 as an example, text data or the like produced by the personal computer 2 are transferred in a data format such as PS (postscript) or PCL (printer control language), and the transferred data are temporarily stored in a buffer (memory 2) on the printer board 601, and are developed on a page memory (memory 1) by an RIP (raster image processor) driven by the CPU.

The image data developed on the page memory (memory 1) are transferred through the SCSI to the sub image processing board 500 and are stored in the hard disk device 503. Here, if the image data developed and stored in the page memory (memory 1) cannot be stored in the hard disk device 503 due to insufficient room, they remain in a waiting state until the hard disk device 503 becomes open.

Incidentally, the images thus developed into the page images on the printer board 601 are transferred to the sub image processing board 500, but the page images are not subjected to the binary image processing, and are simply stored in the hard disk device 503 temporarily. Besides, when the page images thus stored in the hard disk device 503 are read out therefrom, the binary image processing is not carried out with respect to the page images.

Subsequently, the image information thus temporarily stored in the hard disk device 503 is read out from the hard disk device 503 in such a manner that the image information is read out in a predetermined page order, and is transferred to the main image processing board 400. In the main image processing board 400, $\gamma$ correction is applied to the image information, and the laser controller 404 controls the write-in of images by the LSU 46 so that the images are properly reproduced.

[Facsimile Mode]

Operations in the facsimile mode are classified into transmission of an original document to the other party and reception of an original document from the other party.

The transmission of an original document to the other party is first explained as follows. The original document to be transmitted, which is placed at a predetermined position on the RADF 36 of the digital copying machine 1, is sent onto the original document platen 35 of the scanner section 31 sheet by sheet sequentially, and images of the original document are sequentially read by the scanner unit 40 as described above, and thereafter transferred in the 8-bit electronic data form to the main image processing board 400.

Then, the 8-bit electronic data thus transferred to the main image processing board 400 are subjected as 8-bit electronic image data to predetermined image processing on the multivalue image processing section 402. The 8-bit electronic image data are sent to the sub image processing board 500 through the connector 405 on the main image processing board 400 and the connector 505 on the sub image processing board 500. The 8-bit electronic image data are converted from the 8-bit electronic image data to 2-bit electronic image data at the multivalue-to-binary converting part of the binary image processing section 501, as well as subjected to error diffusion and other processing.

Incidentally, the conversion of 8-bit electronic image data into 2-bit electronic image data in addition to other processing such as the error diffusion aims to lessen deterioration of image quality. This is because satisfactory image quality is not obtained by simple multivalue-to-binary conversion in some cases.

The original document to be transmitted, thus converted into binary images, is compressed in a predetermined form, and stored in the memory section 502. Then, when necessary transmission procedure is taken and a state transmissible to the other party is ensured, the original document images in the predetermined compression form read out from the memory section 502 are transferred to the FAX board 603 side. The original document images to be transmitted, thus transferred to the FAX board 603, are therein subjected to necessary processing such as change in the compression form, and thereafter are sequentially transmitted to the other party through communication lines.

The following description will explain processing of original document images transmitted from the other party. When an original document is transmitted from the other party through communication lines, the FAX board 603 receives the original document images transmitted from the other party while taking a necessary communication procedure, and the received images compressed in a predetermined form are sent from the facsimile interface provided in the binary image processing section 501 of the sub image processing board 500 to the compression/expansion processing part or the like of the binary image processing section 501, where the original document images transmitted in the page image form are reproduced.

Subsequently, the original document images thus reproduced as page-unit images are transferred to the main image processing board 400. In the main image processing board 400, γ correction is applied to the original document images, and the laser controller 404 controls the write-in of images by the LSU 46 so that the images are properly reproduced.

[Scanner Mode]

In the scanner mode, original document images read in by the scanner section 31 are transmitted to an external apparatus such as a networked personal computer.

First, the original document to be transmitted which is set at a predetermined position on the RADF 36 of the digital copying machine 1 is supplied sheet by sheet to the original document platen 35 of the scanner unit 40, images of the original document are sequentially read in by the scanner unit 40 designed as described above, and are transferred in a 8-bit electronic data form to the main image processing board 400.

The 8-bit electronic data transferred to the main image processing board 400 are subjected, as 8-bit electronic image data, to a predetermined processing operation on the multivalue image processing section 402. Then, the 8-bit electronic image data are transmitted to the sub image processing board 500 side through the connector 405 on the main image processing board 400 side and the connector 505 on the sub image processing board 500 side, and are stored in the hard disk device 503 which has a large memory capacity.

Thereafter, image information read out from the hard disk device 503 in accordance with necessity is transmitted to an external networked apparatus through the interface section 504 such as the SCSI.

As clear from the above description, the image processing section for applying predetermined processing operations to image information is divided into the following two main parts: (i) the main image processing board 400, which processes original document images read in by the scanner section 31 as multivalue image information; and, (ii) the sub image processing board 500, which applies predetermined processing operations such as binary processing to the original document image information processed as multivalue image information by the main image processing board 400, or applies predetermined processing operations to image information supplied from external apparatuses which are connected thereto through the external interface, and thereafter transfers the processed image information to the multivalue image processing section 402 (main image processing board 400) side.

Further, the main image processing board 400 includes the laser controller 404 for controlling the image information writing operation of the LSU 46, so that images are reproduced by the LSU 46 onto the photosensitive drum 48 of the electrophotographic processing section 47. With this arrangement, the original document images read in by the scanner section 31 can be reproduced as copy images from the laser recording section 32, without losing characteristics which the original document images as multivalue images possess. In the case where a massive original document is processed and outputted at a high speed by using an electronic RDH function or the like, the sub image processing board 500, the hard disk device 503, etc. may be additionally used so that reproduction of copy images is ensured.

Furthermore, it is also possible to apply appropriate processing operations to image information according to characteristic functions which the digital copying machine 1 possesses as a digital device. Here, the operations include processing and outputting operations with respect to image information supplied from external apparatuses including a facsimile machine and a personal computer, as well as, exclusively with respect to image information supplied from a facsimile machine, a binary processing operation for processing original document images which have been multivalued-image-processed (whose characteristics are retained).

Furthermore, by dividing the image processing section, it is possible to prepare many variations (lineups) of the digital copying machine 1, to set up a digital copying machine so as to comply with the user's demand, and to extend the system to comply with the user's demand after the setting.

The CPU 401 provided on the main image processing board 400 controls the sub image processing board 500 as well in the foregoing arrangement. This ensures that the entire flow of the image processing operation which is continuously carried out from one processing section to the other is controlled in the respective processing sections, and the flow of data and processing operations is made smoother, with no possibility of losing image data.

The foregoing is an explanation of the image processing section for processing image data inputted through the scanner section 31, or the extension board group 600, installed in the digital copying machine 1.

[System for Checking User's ID Number]

A network to which the digital copying machine 1 as the image output processing apparatus of the present invention is used in a specific group, for example, a company, and each user as its member has his/her own ID number. In the case where a request for image printing as a print job is made to the foregoing digital copying machine 1 through an external apparatus such as a personal computer connected thereto, the ID number of the user who made the request is attached to the image data as information.

Each user has an ID card in which his/her own ID number is recorded. The ID card is communicable by wireless with the digital copying machine 1, and when a user enters a control area covered by the digital copying machine 1, the digital copying machine 1 reads his/her ID number by communication with the ID card held by the user. In the case where the user has an original document read by the scanner section 31 of the digital copying machine 1, therefore, image data thus read in and the user's ID number are stored along with correspondence therebetween.

The digital copying machine 1 is thus capable of checking an ID number of a user who has entered the control area of the digital copying machine 1, so as to execute various controlling operations based on the ID number. To detect the ID number, the digital copying machine 1 is therefore equipped with, for example, a traveling object identifying device (traveling object identifying section) as disclosed by the Japanese Publication for Laid-Open Patent Publication No. 273338/1993 (Tokukaihei 5-273338, Date of Publication: Oct. 22, 1993).

Figure 5:
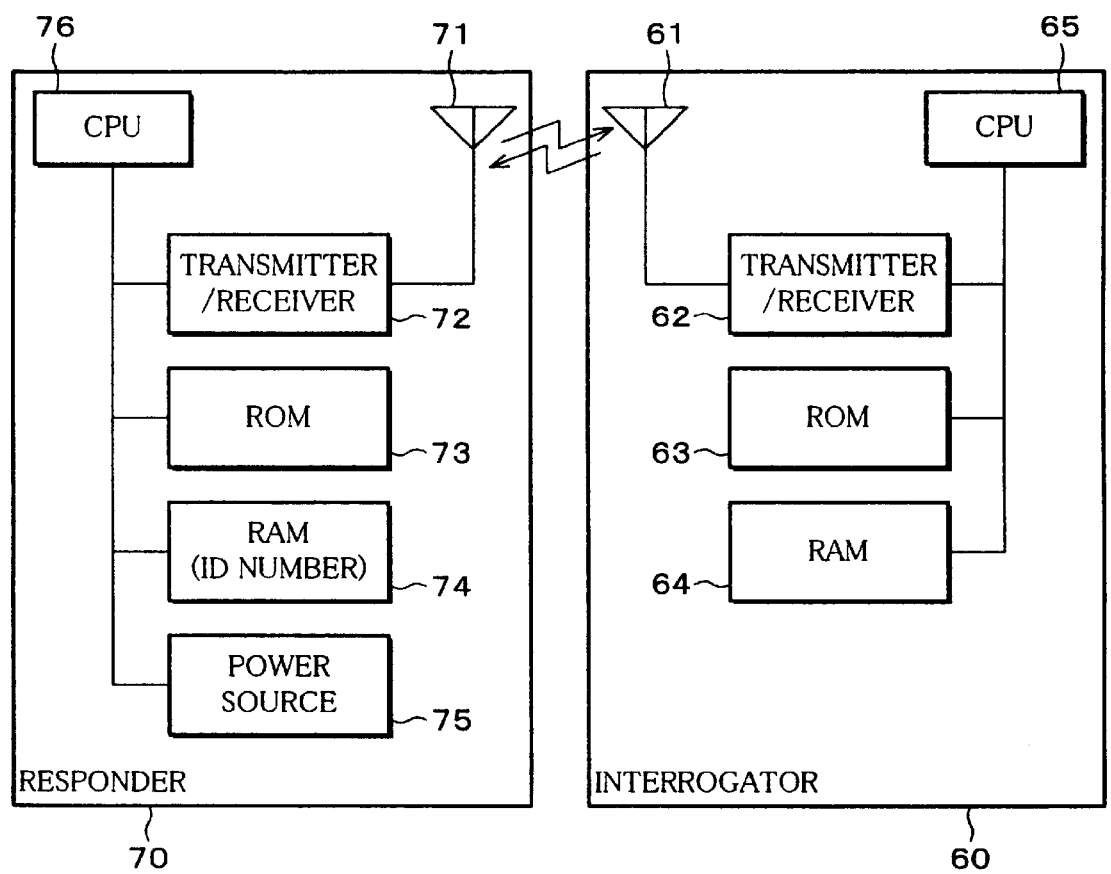
FIG. 5 is a block diagram illustrating an arrangement of a traveling object identifying device having an interrogator provided in the foregoing digital copying machine and a responder which a user has with him/herself.

The foregoing traveling object identifying device is composed of an interrogator 60 and a responder 70 as shown in FIG. 5, and the interrogator 60 is incorporated in the digital copying machine 1 while each user has the responder 70 in a form of the ID card with him/herself. Note that the interrogator 60 is equivalent to the ID card detecting section 201 shown in FIG. 4, while the responder 70 may be a hand-held matter in a form other than the card form, or may be incorporated in another hand-held matter.

The interrogator 60 is equipped with an antenna 61, a transmitter/receiver 62, a ROM 63, a RAM 64, and a CPU 65. The antenna 61 is connected with the CPU 65 via the transmitter/receiver 62, and the ROM 63, the RAM 64, and the CPU 65 are connected with each other. The foregoing CPU 65 is connected with the CPU 401 of the main image processing board 400, though not shown in FIG. 4. The interrogator 60 is controlled by the CPU 65 based on a system program stored in the ROM 63.

The responder 70 is equipped with an antenna 71, a transmitter/receiver 72, a ROM 73, a RAM 74, a power source (battery) 75, and a CPU 76. The antenna 71 is connected with the CPU 75 via the transmitter/receiver 72, and the ROM 73, the RAM 74, and the CPU 76 are connected with each other. The foregoing ROM 73 generally stores a system program for controlling the responder 70, while the RAM 74 stores an ID number imparted to a user who holds the responder 70.

The foregoing interrogator 60 transmits an ID request signal to an unspecified number of responders 70 usually in a stand-by state, via the transmitter/receiver 62 and the antenna 61. When one responder 70 enters an effective area of radio waves from the interrogator 60 (that is, the control area of the digital copying machine 1), the responder 70 receives the ID request signal and transmits the ID number as response signal to the interrogator 60.

The digital copying machine 1 is thus capable of always checking whether or not an ID card with an ID number is present in the control area. Upon detecting presence of an ID card, the digital copying machine 1 checks its ID number, and operates assuming that the user holding the ID card is present in front of the digital copying machine 1.

The digital copying machine 1, then, checks whether or not a print job corresponding to the ID number is stored in the hard disk device 503, and if a print job corresponding to the ID number is present therein, the digital copying machine 1 outputs the same through the laser recording section 32 so that images thereof are reproduced and recorded.

The following description will explain Examples 1 through 8 in detail as concrete examples of operation control by the digital copying machine 1.

EXAMPLE 1

In the case where image data (text data, etc.) which a user produced with a personal computer are to be printed out in a network system with which a digital copying machine 1 incorporating the foregoing traveling object identifying device is connected, the user issues an instruction for printing the foregoing image data, by operating the personal computer.

The network system is managed by a network server (print server), and when the user issues an instruction for printing the image data, the image data and information concerning the printing is temporarily sent from the personal computer to the network server, along with the user's ID number attached thereto.

ID numbers, attached in such a case, are preliminarily stored in respective personal computers managed by the users individually, as identification management information of each user. Alternatively, a traveling object identifying device may be installed in a personal computer to automatically identify the user using the personal computer, so that the detected ID number is transferred automatically along with the image data and information on the printing upon issuance of an instruction for the transfer (output) of the image data by the user.

Subsequently, if judging that the recording (printing) of the image data is possible as a result of checking the state of the digital copying machine 1, the network server transfers the image data temporarily stored therein, information on the printing, and the ID number to the digital copying machine 1 as a print job. The digital copying machine 1 receives the foregoing print job via the printer board 601, and stores the received print job in the hard disk device (memory managing means) 503.

FIG. 6 illustrates an example of a management table for storing and managing the print job in the hard disk device 503 of the digital copying machine 1. Incidentally, the foregoing explanation describes that the print job is stored in the hard disk device 503 of the digital copying machine 1, but the print job may be stored on the network server side.

The digital copying machine 1 in accordance with the present Example 1 is designed so that, as described above, upon detection of an ID card in a state in which a plurality of print jobs are stored in the hard disk device 503, the digital copying machine 1 checks an ID number stored in the ID card, and displays the print job corresponding to the ID number. This ensures that the user confirms the print job that he/she instructed and surely obtains an intended outputted matter (recorded matter), resulting in improvement of the convenience of the users. The operation in this case is explained with reference to a flowchart of FIG. 1.

The digital copying machine 1 always checks presence/absence of an ID card in a predetermined area with use of the traveling object identifying device as described previously. When presence of an ID card in the control area covered by the digital copying machine 1 is detected by the traveling object identifying device (if YES at S1), an ID number of the ID card is checked (S2), and presence/absence of a print job corresponding to the detected ID number in the hard disk device 503 is checked (S3).

Upon confirmation of presence of a print job corresponding to the ID number (if YES at S3), the foregoing print job is listed up in a print job list, along with the information on the printing, and is displayed by the display section 104 of the manipulation panel 103 of the digital copying machine 1 (S4). Here, in the case where presence of a plurality of print jobs corresponding to the ID number is confirmed, information on these plural print jobs is listed on the LCD display section 104.

Thereafter, by the laser recording section 32 of the digital copying machine 1, whether the printing is possible or not is judged (S5). In other words, at the foregoing step S5, whether or not loading of sheets of paper or toner is required is checked. In the case where the printing is ready, the output of the print job displayed at S4 is executed (S6). On the contrary, in the case where there is a defect such as shortage of sheets of paper or toner thereby to make the printing be judged unready, the foregoing defect is displayed (S7). When the user clears the defect (S8), then the print job displayed at S4 is executed (S6).

At S7, upon defect display, only information corresponding to the confirmed ID number, that is, only information necessary for the user in front of the digital copying machine 1, is displayed. For example, if staples run short but the print job to be executed does not need a stapling operation, the judgement at S5 is that there is no defect, and the display at S7 is not executed. Therefore, displaying information unnecessary for the user thereby confusing the user by no means takes place.

Further, in the case where presence of a print job corresponding to the detected ID number is not confirmed at the previous step S3, absence of a corresponding print job is displayed (S9), with which the operation ends.

The following description will more concretely explain the foregoing operation. In the case where, for example, print jobs as shown in FIG. 6 are stored in the foregoing hard disk device 503, when an ID card with an ID number "0121" is detected, print jobs 2 and 3 corresponding to the ID number "0121" are selected, and a display as shown in FIG. 7 appears on the LCD display section (display section) 104 of the manipulation panel 103.

Figure 7:
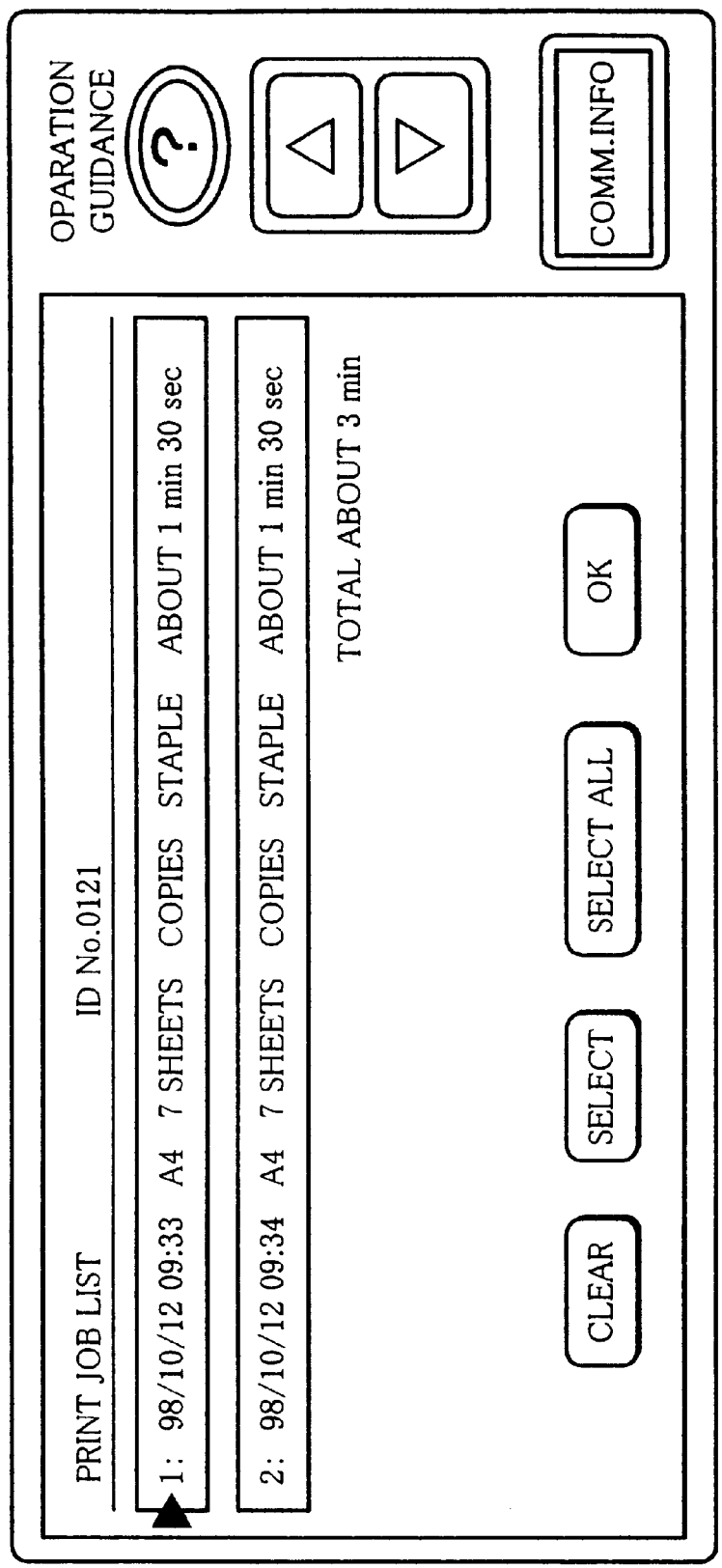
FIG. 7 is an explanatory view illustrating an example of a display screen showing guidance to a user, which turns up when the user's ID card is detected.

Here, in output of the print job from the laser recording section 32 of the digital copying machine 1, an output processing time of each print job and a total output processing time needed to complete all the print jobs are displayed in the display of FIG. 7, so that the user who comes to the digital copying machine 1 can check when the print jobs will finish. This enables the user to estimate when, after the start of the print job, he/she should come back to the digital copying machine 1 to fetch the outputted matters.

Further, the print job may be automatically outputted in response to the detection of the user's ID card, or alternatively, the user may be allowed to select a certain print job from among a plurality of print jobs listed on the display and instruct the laser recording section 32 of the digital copying machine 1 to give priority to the selected print job. In this case, a selection key may be provided with which the user can select a certain print job to be printed out. FIG. 7 shows a concrete example in which the LCD display section 104 is a touch panel, and a "SELECT" key and an "OK" key are provided as touch keys. The user uses the "SELECT" key to move a cursor displayed at a head of a job item in the list so as to select one to be printed out, and uses the "OK" key to permit output of the selected print job.

In contrast, a certain print job can be selected from among a plurality of print jobs listed so as to be cancelled. In this case, in the display shown in FIG. 7, a selection key with which the user can freely select a certain print job to be cancelled may be provided. A concrete example is a display shown in FIG. 7 in which a "CLEAR" key is further provided. The user uses the "SELECT" key to move a cursor displayed at a head of a job item in the list so as to select one to be cancelled, and uses the "CLEAR" key to cancel the output of the print job thus selected.

Here, the manipulation panel 103 including the LCD display section 104 is equivalent to a selecting section recited in claims. Further, permission and cancellation of output of a print job according to the foregoing selection is executed by the CPU 401, which is equivalent to a permitting section and an output cancelling section.

Incidentally, in the foregoing explanation, the digital copying machine 1 temporarily stores a print job instructed by an external apparatus in the hard disk device 503, and at a stage at which presence of a corresponding ID number is confirmed by the traveling object identifying device, output of the print job corresponding to the ID number is executed (this mode is hereinafter referred to as first output processing mode). Alternatively, however, print jobs may be sequentially outputted at predetermined timings (at timings with which output processing is possible), without stopping the print jobs in the hard disk device 503 (this mode is hereinafter referred to as second output processing mode). In this case, the user may set in which output processing mode a print job is outputted, in the first or second output processing mode, at a stage at which the user issues a print job output instruction on an operation screen of a personal computer.

To be more specific, some users go to the digital copying machine 1 to fetch the outputted matter immediately after issuing the output command with the personal computer, whereas in some cases a print job is massive thereby taking a lot of time till the completion of the output. In the case where the output preferably starts immediately after the output request is issued, the output is preferably executed in the second output processing mode so that the print jobs are sequentially outputted at predetermined timings (at timings with which output processing is possible) without being stopped in the hard disk device 503. To do so, at the time when the user issues the output request from the personal computer, the user selects, on the screen of the personal computer, whether to temporarily store the print job in the hard disk device 503 and thereafter output the same (in the first output processing mode) or to immediately start the output of the print job (in the second output processing mode).

As described above, a digital copying machine in accordance with Example 1 can be designed so as to be composed of (i) a hard disk device 503 for storing and managing a print job along with an ID number, (ii) a laser recording section 32 for outputting images in accordance with a print job, (iii) a CPU 401 for checking an ID number and permitting output of a print job corresponding to the ID number through the laser recording section 32, and (iv) an LCD display section 104 for displaying information relating to the print job, output of which is permitted by the CPU 401.

This enables the user to confirm contents of a print job corresponding to the user's ID number. Here, since contents of print jobs corresponding to the other ID information are not displayed, the displayed contents are easy to understand. Further, the user is informed of occurrence of defects during transmission of image data, a state in which image data are being transmitted and cannot be outputted, etc.

Furthermore, in the case where a plurality of print jobs corresponding to the ID number detected by the traveling object identifying device are present, the LCD display section 104 lists up the plural print jobs with the relevant information, thereby allowing the user to know contents of all the print jobs corresponding to his/her ID number.

Furthermore, in the case where print jobs corresponding to the ID number detected by the traveling object identifying device are present, the LCD display section 104 also displays information relating to output processing of the print jobs as relevant information, thereby allowing the user to check, not only the contents of the print job, but also a time that it takes to complete all the print jobs, etc.

Furthermore, in the case where, upon detection of an ID number by the traveling object identifying device, the digital copying machine 1 is judged to have a defect in execution of the print jobs corresponding to the detected ID number, the content of the defect is preferably displayed on the LCD display section 104. This results in that the user is, upon detection of his/her ID number, informed of an item which will be a problem in executing the print jobs corresponding to the ID number. It follows that, only when the user who instructed the print jobs is identified, the item which will be a problem can be surely informed to the user. In this case, besides, the other users are not affected at all, and such a problem as putting all the users using the digital copying machine 1 into confusion does not occur, thereby allowing the users to smoothly use the digital copying machine 1.

Furthermore, the CPU 401 displays a list of print jobs corresponding to a detected ID number on the LCD display section 104, and is capable of instructing prioritization of a desired print job, from among the print jobs displayed on the LCD display section 104, so that the prioritized print job is outputted first. This ensures that a plurality of print jobs are efficiently outputted in an order in which those prioritized by the user are outputted first.

Furthermore, the foregoing CPU 401 displays a list of print jobs corresponding to a detected ID number, and is capable of instructing cancellation of output of a certain print job among the print jobs displayed on the LCD display section 104. This enables to, even after designation of print jobs, freely cancel any print jobs which become unnecessary, by checking the same on the device (LCD display section 104).

Furthermore, the foregoing digital copying machine 1 has (i) a first output processing mode in which print jobs are temporarily stored and managed along with ID numbers, and thereafter, upon detecting an ID number, only print jobs corresponding to the ID number are outputted, and (ii) a second output processing mode in which print jobs are outputted without being suspended. In the first output processing mode, the print job is outputted at a stage in which it is confirmed that the user is near the apparatus, thereby by no means causing image-recorded matters to be mixed up at the discharge section. The second output processing mode is effective in the case where recorded as images is information which should not be seen by an unspecified number of people, such as confidential information.

EXAMPLE 2

A digital copying machine 1 in accordance with Example 2 is designed as follows: when an ID card is detected while a plurality of print jobs are stored and managed by the hard disk device 503, an ID number stored in the ID card is read, and a plurality of print jobs corresponding to the ID number are outputted in a predetermined order, so that the entirety of the print jobs is efficiently outputted. The operation in this case is as shown in a flowchart of FIG. 8.

Figure 1:
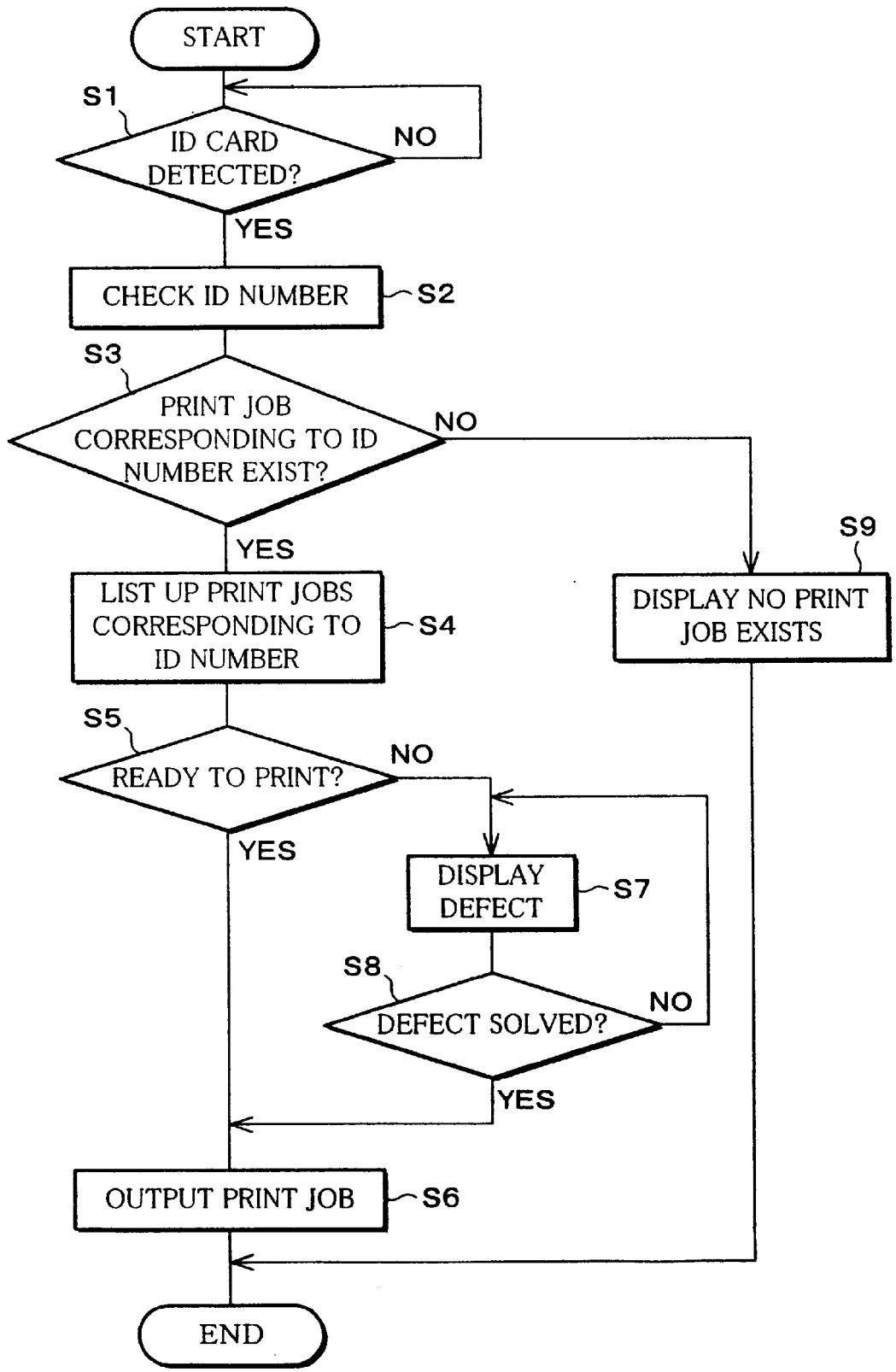
FIG. 1, which concerns an embodiment of the present invention, is a flowchart showing an operation of a digital copying machine in accordance with Example 1.
Figure 8:
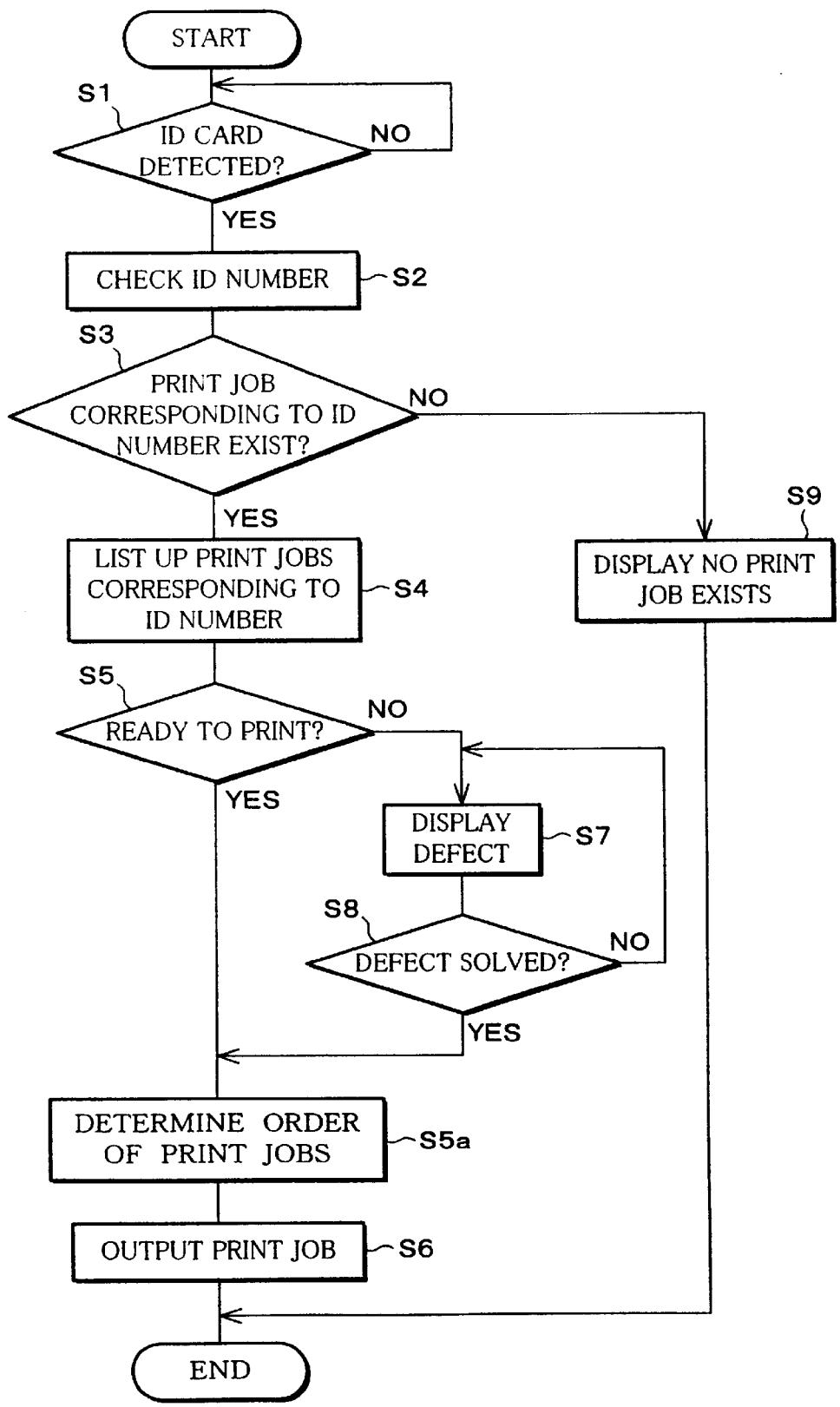
FIG. 8, which concerns another embodiment of the present invention, is a flowchart of an operation of a digital copying machine in accordance with Example 2.

The flowchart of FIG. 8 is similar to the flowchart shown in FIG. 1, except that a step (S5a) for determining the order of print jobs in outputting according to the detected ID number is provided between S5 and S6. At the foregoing S5a, regarding a plurality of print jobs listed up, an order in which these print jobs are outputted is automatically determined according to predetermined conditions. The following description will explain an output order determining method such that print jobs are efficiently and surely outputted (printed).

For example, in the case where the print jobs shown in FIG. 6 are stored and managed by the hard disk device 503, upon detection of an ID card with an ID number "0121", print jobs 2 and 3 corresponding to the ID number "0121" are selected, and here, a display as shown in FIG. 7 is executed by the LCD display section 104 of the operation panel 103.

As shown in FIG. 7, output is instructed regarding two print jobs corresponding to the ID number "0121" in succession. In such a management state, upon detection of presence of a user with the ID number "0121", the order of output of the print jobs is determined based on respective lapses of time since acceptance of these print jobs. To be more specific, in the case where a lapse of time from issuance of an output command until detection of the ID number "0121" regarding each of the foregoing two print jobs is shorter than a predetermined period, the both are assumed to be needed by the user, and the print jobs are sequentially outputted in an order of reception of the print jobs, in response to manipulation by the user of the "OK" key on the display screen shown in FIG. 7.

Incidentally, the foregoing lapse of time is managed by the hard disk device 503 and the CPU 401, and the foregoing hard disk device 503 and the CPU 401 are equivalent to a lapse of time management section set forth in claims. Output control is conducted by the CPU 401, which is equivalent to an output control section.

On the other hand, from the print job storage/management list shown in FIG. 6, it can be found that a user with an ID number "0009" made instructions for output of two print jobs, but at a great time interval. When presence of the user with the ID number "0009" is detected in this state, a list as shown in FIG. 9 is displayed on the display screen of the manipulation panel. Incidentally, assume that, when the ID number is read, the lapse of time since the earlier instruction for print job output exceeds a preliminarily set period, and that, at the same time, the lapse of time since the later instruction for print job output does not exceed the preliminarily set period.

In the case where in this state the user manipulates the "OK" key, the later instructed print job output, assumed to be given higher priority, is first executed. The following is the reason why, in the case where a lapse of time since output instruction of a print job does not exceed a set period, the print job is given priority in outputting.

Output of a print job is likely needed much by a user in the case where presence of the user with an ID number corresponding to the print job is detected within a predetermined period of time since instruction of output of the print job, whereas output of a print job is possibly unnecessary for a user in the case where presence of the user is detected after a lapse of time exceeding the predetermined period of time.

Therefore, at a stage where presence of the user with the ID number "0009" is detected, the later instructed print job output may be immediately started upon manipulation of the "OK" key, whereas the earlier instructed print job output does not follow the foregoing output, but may be suspended temporarily to check with the user. This enables the user to obtain only printed matters the user really needs.

Alternatively, the following method may be applied: in the case where, among instructed outputs of print jobs, there are some which have not started yet for a period exceeding a predetermined period since the issuance of the instruction, the such print jobs are displayed, and whether or not each print job output instruction is valid is checked with the user before outputting. Moreover, the foregoing method may be further arranged so that, in the case where there are a plurality of instructed print job outputs which have not started yet for a period exceeding a predetermined period since the issuance of the instruction, the order of output of these print jobs is determined as the user desires.

The foregoing method may be further modified so that, in the case where upon detection of an ID number a plurality of print jobs corresponding to the ID number exist, the output may be sequentially carried out from a job which is ready to be subjected to output (recording) by the digital copying machine 1.

Here, an example of a method for judging whether output is ready or not is a method of judgement based on a type (size, characteristics, etc.) of a recording material (paper). More specifically, characteristics of recording materials set in feed cassettes of the apparatus are checked, and compared with characteristics of designated recording materials for print jobs. Here, in the case where some of the designated recording materials for the print jobs are not set in the feed cassettes, output of such print jobs are impossible, and hence, the other print jobs which are ready to be outputted may be first outputted sequentially. Incidentally, as a method for checking characteristics of recording materials, any one of conventionally known methods (preliminarily registering through the manipulation panel regarding each feed cassette, providing to each feed cassette a signal source which expresses characteristics by combinations of a plurality of blocks, etc.) may be applicable.

To determine the order of output of print jobs, apart from the foregoing methods, the following method may be applicable, for example: respective lapses of time since the issuance of instructions for printing by the user are managed, and an order of output of print jobs may be determined on the basis of the lapses of time in combination with a plurality of other factors, for example, by ranking a job lower in the order when a lapse of time since instruction for output of the same exceeds the predetermined period, while sequentially outputting the jobs from the latest one.

As described above, a digital copying machine in accordance with Example 2 can be designed so as to be composed of (i) a hard disk device 503 for storing and managing print jobs along with ID numbers, (ii) a laser recording section 32 for outputting images in accordance with the print jobs, and (iii) a CPU 401 for checking the ID number and permitting output of print jobs corresponding to the ID number through the laser recording section 32, and controlling an order of output of the print jobs permitted to be outputted.

Even if a plurality of print jobs corresponding to a certain ID number are stored and managed, the foregoing arrangement ensures efficient output of the whole print jobs.

Further, the foregoing CPU 401 controls the order in which print jobs stored and managed by the hard disk device 503 are to be outputted, based on respective lapses of time since output instructions regarding the print jobs. This ensures efficient output in a predetermined order of the print jobs which the user will need, in the case where a plurality of print jobs corresponding to the user's ID number are stored and managed.

Further, the foregoing CPU 401 controls the order in which print jobs stored and managed by the hard disk device 503, so that, in the case where the print jobs were received within a predetermined period, the print jobs are outputted in the order in which they were received. This enables the user to obtain outputted matters of print jobs which the user needs.

Further, in the case where, among print jobs stored and managed in the hard disk device 503, a print job was received not less than a predetermined period behind a time of reception of a print job first received, the CPU 401 prioritizes the latest received print job in outputting. This enables the user to surely obtain an outputted matter of the latest print job that the user needs.

Furthermore, the CPU 401 permits output of a print job stored and managed in the hard disk device 503 in the case where the print job was received within a predetermined period of time. This enables the user to surely obtain an outputted matter of a print job which the user needs.

The CPU 401 suspends (stands by for) output of a print job stored in the hard disk device 503 in the case where the print job was received not less than a predetermined period before. This enables the user to surely obtain only an outputted matter of a print job that the user needs.

The CPU 401 outputs images of a certain print job, selected from among the print jobs corresponding to the detected ID number. This ensures that, if a plurality of print jobs corresponding to the ID number are stored and managed, only a print job that the user needs is outputted.

The CPU 401 outputs images of print jobs corresponding to a detected ID number sequentially from a print job which the apparatus is ready to output. This ensures that, among a plurality of print jobs corresponding to the ID number, a print job which is ready to be outputted is prioritized in outputting, thereby ensuring efficient output of the whole print jobs without piling up the print jobs.

EXAMPLE 3

A digital copying machine 1 in accordance with Example 3 is designed so as to, in the case where another ID number is detected during output of a print job corresponding to an already detected ID number, carry out preparation for output of a print job corresponding the newly detected ID number, in parallel with the output of the print job currently executed, so that the entirety of output of the print jobs is efficiently carried out.

In the foregoing digital copying machine 1, in the case where, during an operation of outputting a print job corresponding to a detected ID number, a new ID number is detected by the foregoing traveling object identifying device, preparation for output of a print job corresponding to the newly detected ID number (hereinafter referred to as new print job) is carried out in parallel with the print job outputting operation currently carried out.

Preparation of output herein includes development of data temporarily stored in the hard disk device 503, preliminary checking of presence/absence of recording paper, preliminary checking of presence/absence of staples in a post-processing device (stapler), etc. This aims at smooth shift to output of the new print job after completion of the current print job output.

The foregoing digital copying machine may be further designed so as to, in the case where another ID number is detected during output of a print job corresponding to an already detected ID number, determine which print job should be prioritized in processing, among print jobs including the currently processed print job corresponding to the previously detected ID number and the new print job corresponding to the newly detected ID number.

For example, in the case where the currently outputted print job is massive while the new print job is small, it is possible to prioritize the small print job involving output of a less number of sheets.

By taking this method of processing print jobs, priority is judged regarding print jobs corresponding to the user's ID numbers so far detected by the digital copying machine 1, and output is executed based on the judgement. Therefore, it is possible for the apparatus to surely process prioritized print jobs among the print jobs to be outputted currently, and provide the outputted matters to the user.

At this stage, if there are some inadequacies for output of the new print job, the inadequacies are informed to the user in advance, so that recording paper, staples of the post-processing device (stapler), etc. can be supplied.

The foregoing digital copying machine may be further designed so as to, in the case where another ID number is detected during output of a print job corresponding to an already detected ID number, if the previously detected ID number (i.e., the ID number corresponding to the currently outputted print job) is no longer detected, prioritize the print job corresponding to the newly detected ID number in outputting.

By the foregoing processing method, the print job corresponding to the user's ID number currently detected by the digital copying machine 1 is prioritized in outputting, thereby promptly providing a recorded matter to the user on the spot.

As described above, a digital copying machine 1 in accordance with Example 3 can be designed so as to be composed of (i) a hard disk device 503 for storing and managing print jobs along with ID numbers, (ii) a laser recording section 32 for outputting images in accordance with the print jobs, and (iii) a CPU 401 for checking the ID number and permitting output of print jobs corresponding to the ID number through the laser recording section 32, and controlling output of the print jobs permitted to be outputted, the CPU 401 being further arranged so as to, in the case where a new ID number is detecting during output of a print job, carry out preparation for output of a print job corresponding to the newly detected ID number in parallel.

This ensures that completion of the current print job output is smoothly (efficiently) followed by output of the new print job corresponding to the newly detected ID number.

Upon detection of a new ID number during output of a print job, the foregoing CPU 401 develops data of a print job corresponding to the newly detected ID number in parallel with the current output. By so doing, stored data of a print job are not developed before a stage of output of the print job, but remain being stored and managed, thereby ensuring efficient utilization of the hard disk device 503. Besides, completion of the current print job output is followed, without cessation (efficiently), by a print job corresponding to the newly detected ID number.

Furthermore, upon detection of a new ID number during output of a print job, the foregoing CPU 401 checks whether or not the digital copying machine 1 is ready to process a print job corresponding to the newly detected ID number, and if there are some inadequencies, they are notified by displaying on the LCD display section 104. It follows that an inadequate state such as shortage of recording paper can be notified to the user in advance, before start of output of the print job, thereby allowing the user to solve the inadequencies (to execute preparation, supply matters in shortage, etc.) during output of another job. Besides, completion of the current print job output is followed, without cessation (efficiently), by output of a print job corresponding to the newly detected ID number.

Furthermore, a digital copying machine 1 in accordance with Example 3 can be designed so as to be composed of (i) a hard disk device 503 for storing and managing print jobs along with ID number, (ii) a laser recording section 32 for outputting images in accordance with the print jobs, and (iii) a CPU 401 for checking the ID number and permitting output of print jobs corresponding to the ID number through the laser recording section 32, and controlling output of the print jobs permitted to be outputted, the CPU 401 being further arranged so as to, in the case where new ID number is detecting during output of a print job, determine which print job should be prioritized in processing, among print jobs including the currently processed print job corresponding to the previously detected ID number and the print job corresponding to the newly detected ID number.

By taking this method, priority is judged regarding print jobs corresponding to the ID number so far detected, and output is executed based on the judgement. Therefore, it is possible to surely process prioritized print jobs among the print jobs to be outputted currently, and provide the recorded matters to the user.

Furthermore, a digital copying machine 1 in accordance with Example 3 can be designed so as to be composed of (i) a hard disk device 503 for storing and managing print jobs along with ID number, (ii) a laser recording section 32 for outputting images in accordance with the print jobs, and (iii) a CPU 401 for checking the ID number and permitting output of print jobs corresponding to the ID number through the laser recording section 32, and controlling output of the print jobs permitted to be outputted, the CPU 401 being further arranged so as to, in the case where new ID number is detecting during output of a print job, if at this time the previously detected ID number is no longer detected, prioritize the print job corresponding to the newly detected ID number, in outputting.

By the foregoing processing method, the print job corresponding to the user's ID number currently detected by the digital copying machine 1 is prioritized in outputting, thereby promptly providing a recorded matter to the user on the spot.

EXAMPLE 4

A digital copying machine 1 in accordance with Example 4 is designed so as to, in the case where an instruction for output in another mode is received before output of a print job corresponding to a detected ID number starts, temporarily suspend the output of the print job in the printer mode, so as to be open for use by the user in a desired state.

Since the digital copying machine 1 in accordance with Example 4 is capable of operating in the copy mode and the FAX mode apart from the printer mode, in some cases the user who has instructed output of a print job approaches the digital copying machine 1 for another purpose, or namely, to use the digital copying machine 1 in a mode other than the printer mode (copy mode, FAX mode). In such cases, the user possibly wishes to carry out an operation in the copy mode or the FAX mode, prior to the print job output.

Figure 10:
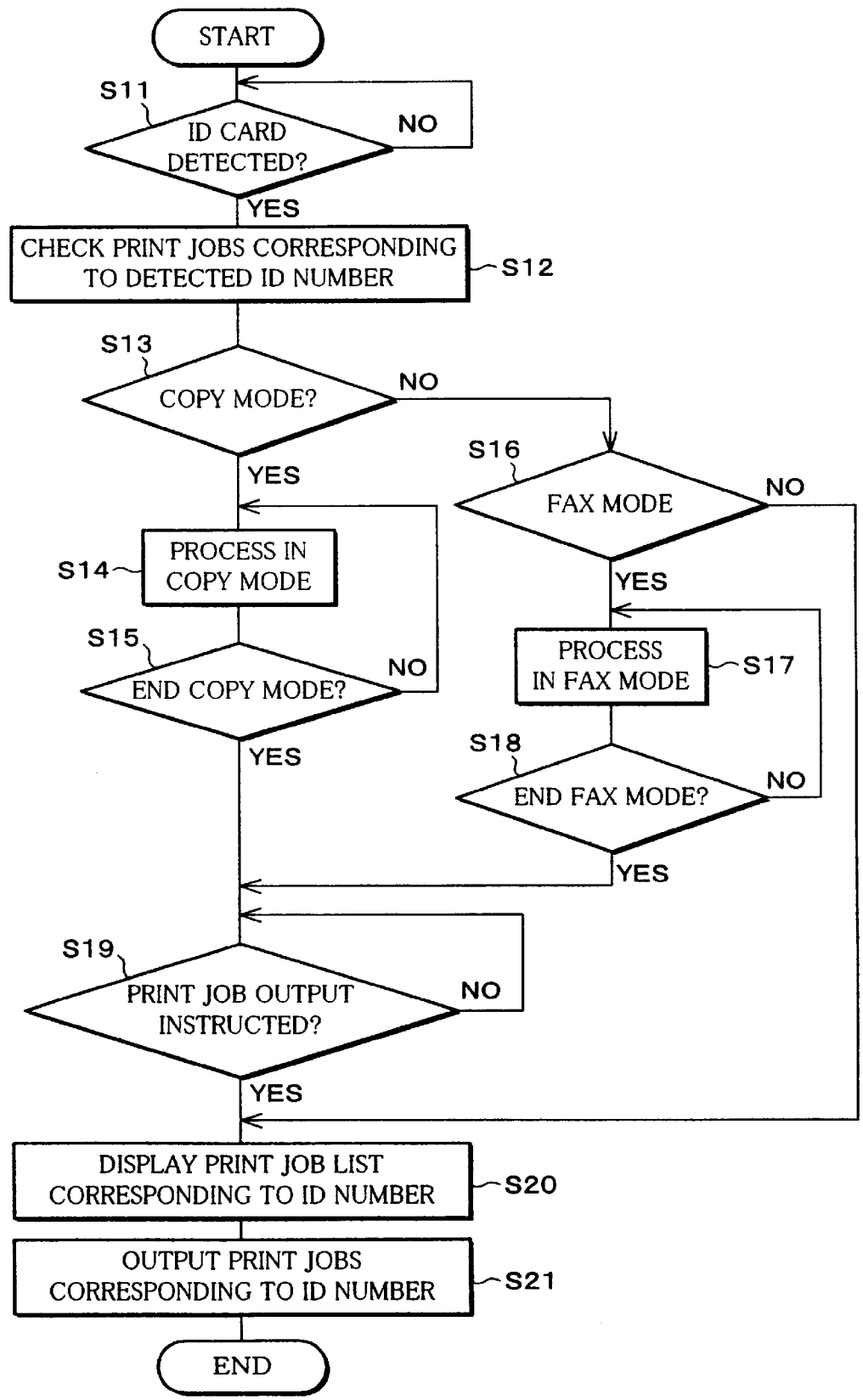
FIG. 10, which concerns still another embodiment of the present invention, is a flowchart of an operation of a digital copying machine in accordance with Example 4.

Therefore, in the case where, at a stage where presence of a print job corresponding to a user's ID number has just been confirmed or being confirmed, the same user instructs an operation mode through the manipulation panel of the digital copying machine 1, the digital copying machine 1 prioritizes the processing operation in the instructed mode. This process is described below with reference to a flowchart in FIG. 10.

First of all, when the user approaches the digital copying machine 1, the user's ID number is detected by the traveling object identifying device shown in FIG. 5 (S11). The digital copying machine 1 checks whether or not a print job corresponding to the detected ID number is stored in the hard disk device 503 (S12).

Figure 11:
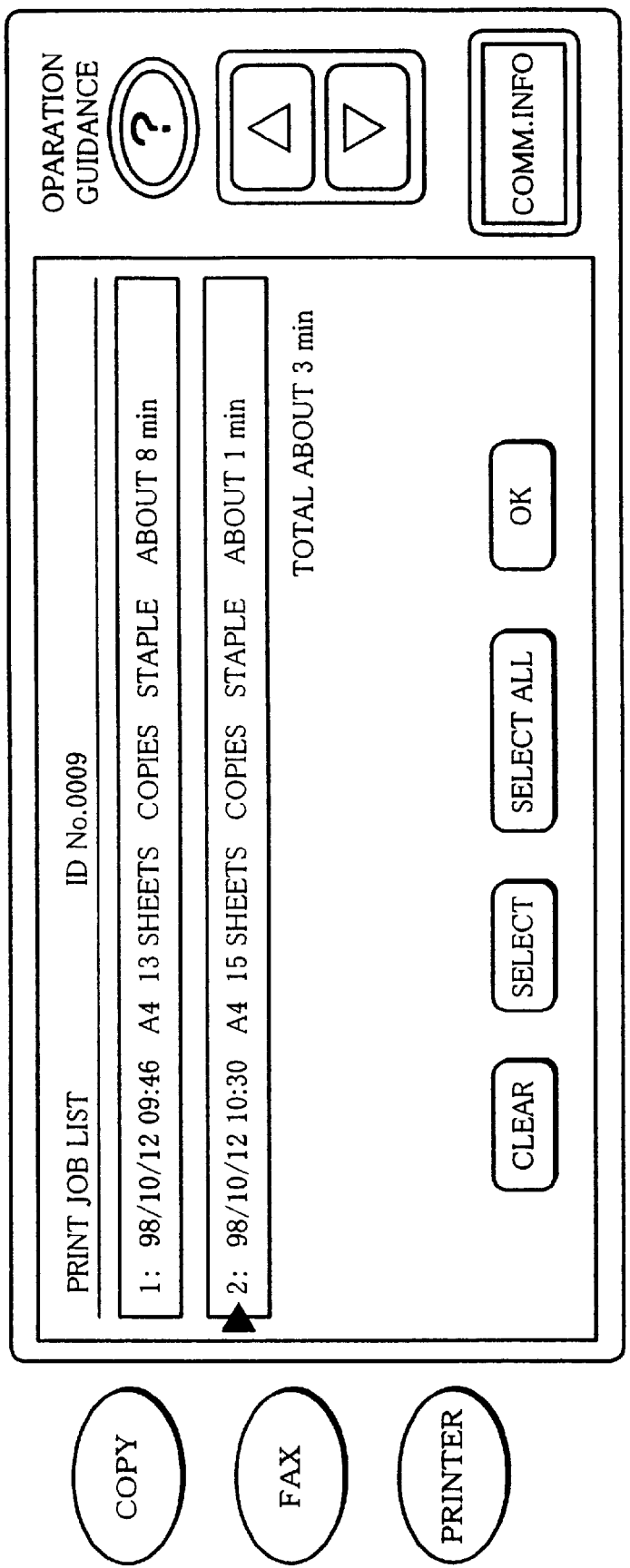
FIG. 11 is an explanatory view illustrating a manipulation panel including a display screen showing guidance to a user, which turns up when the user's ID card is detected.

Here, in the case where the foregoing user instructs the operation mode switching through the manipulation panel so as to conduct a processing operation in an operation mode other than the printer mode, for example, in the copy mode or in the FAX mode, an operation in the instructed mode is prioritized. For example, when the user's ID number is detected as the user approaches to the digital copying machine 1, a list of print jobs corresponding to the foregoing ID number is displayed as shown in FIG. 11, but the user is allowed to switch the mode to an operation mode the user desires, by manipulating an operation mode key on the manipulation panel.

If the mode is switched to the copy mode by the user (YES at S13), a processing operation in the copy mode is carried out (S14, S15), followed by shift to a stand-by state in which an instruction for output of a print job from the user is awaited (S19). If the mode is switched to the FAX mode by the user (YES at S16), a processing operation in the FAX mode is carried out (S17, S18), also followed by shift to a stand-by state in which an instruction for output of a print job from the user is awaited (S19).

When the user instructs output of print jobs corresponding to the user's ID number at S19, a list of the print jobs is displayed (S20), and subsequently a print job outputting operation is executed (S21).

Here, in the case where print jobs corresponding to the user's ID number are present, even with shift to a screen for an operation in the mode instructed by the user, a guidance to the list of the print jobs is always displayed, and a further detailed list of the print jobs corresponding to the user's ID number as shown in FIG. 9 is displayed in response to the instruction by the user for output of print jobs at S19. Thus, the user is allowed to use the digital copying machine 1 in a desired mode, and if a print job corresponding to the user exists, the display is always ready to show the print job.

In the case where at a stage of an end to the operation mode instructed by the user, the mode is switched to the printer mode, and upon issuance of instruction by the user for output of print jobs, the print jobs corresponding to the user's ID number are outputted. With this arrangement, the apparatus by no means automatically executes output of print jobs after completion of the prioritized operation in the specifically instructed mode. Accordingly, recorded matters outputted in another operation mode are not mixed with recorded matters of the print jobs, and the recorded matters are surely provided to the user.

As described above, a digital copying machine 1 in accordance with Example 4 can be designed so as to be composed of (i) a hard disk device 503 for storing and managing print jobs along with ID numbers, (ii) a laser recording section 32 for outputting images in accordance with the print jobs, and (iii) a CPU 401 for checking the ID number and permitting output of print jobs corresponding to the ID number through the laser recording section 32, and controlling output of the print jobs permitted to be outputted, the CPU 401 being further arranged so as to temporarily suspend the print job output when an instruction for another image processing operation is detected before start of the print job output. This ensures that the apparatus surely operates in a state desired by the user.

Furthermore, in the case where an instruction for another image processing operation is detected before start of the print job output, the CPU 401 carries out the image processing operation in accordance with the newly detected instruction, while informing the user of the presence of print jobs to be outputted. This enables the user to confirm the presence of print jobs to be outputted. Furthermore, this prevents such print jobs from remaining unprocessed and piling up in the hard disk device 503, thereby making it possible to make effective (maximum) use of the hard disk device 503.

Furthermore, in the case where an instruction for another image processing operation is detected before start of the print job output, the CPU 401 carries out the image processing operation in accordance with the newly detected instruction, and thereafter, upon detection of an instruction for output of the print jobs which have been supposed to be outputted, the CPU 401 starts the output of the print jobs. This ensures that the print jobs are outputted at a stage where the image processing operation in accordance with the newly detected instruction is completed, and therefore, does not cause outputted recorded matters to be mixed up.

EXAMPLE 5

A digital copying machine 1 in accordance with Example 5 is designed so as to (i) manage data on past image output timings (periods since reception of a print job until detection of a corresponding ID number) regarding each ID number as statistical information, and (ii) when the apparatus becomes required to output print job data stored therein, output the print job at a timing determined on the basis of past output states.

More specifically, the foregoing digital copying machine 1 checks whether or not a print job corresponding to the detected ID number is stored in the hard disk device 503, and if such a print job is present, the print job is reproduced in an image form from the recording section of the digital copying machine 1, while a process from the instruction for the output until the completion of the output is managed as history information. Output processing control described below aims to use this history information to determine optimal output timings.

Incidentally, the management of the foregoing statistical information is executed by the hard disk device 503 in combination with the CPU 401, and the foregoing hard disk device 503 and the CPU 401 are equivalent to a statistical information managing section set forth in claims.

The following description will explain a method for, if a plurality of ID numbers are detected and presence of respective print jobs corresponding to these ID numbers is detected as well, determining print jobs corresponding to which ID number should be prioritized, on the basis of past print job output states.

As history information, each lapse of time since a user issuing an instruction for print job output until the user coming to the copying machine (until detection of the user's ID number by the traveling object identifying device of the copying machine) is managed along with correspondence to the ID number, as shown in FIG. 13. FIG. 13 shows management of information on the user with an ID number "0042", by which five print jobs are managed.

Thus, the digital copying machine 1 in accordance with Example 5 statistically manages a reception time and an output time (picking-up time) of each print job, concerning each user. By recording the reception and picking-up times of each print job, found is a lapse of time (hereinafter referred to as picking-up period) since issuance of instruction for printing until the user coming there to pick up the outputted matter. With this, an average of an outputted matter picking-up period (hereinafter referred to as average picking-up period) is calculated regarding each user. In the case where a plurality of ID numbers are detected and presence of respective print jobs corresponding to these ID numbers is confirmed, prioritization in outputting is determined based on this managed history information so that a print job requested by a user with a shorter average picking-up period is outputted earlier.

Furthermore, since memory capacity of the hard disk device 503 for storing print jobs is limited, when jobs stored therein nearly reach the limit of the capacity, the hard disk device 503 might possibly be unable to store a new print job to meet a request for output of the print job. To solve this problem, the apparatus is designed so as to, when the memory of the hard disk device 503 becomes full or a quantity of data stored therein reaches a predetermined level, automatically output stored print jobs until a memory region of a predetermined capacity becomes open, without detection of ID numbers.

In this case as well, past output history information corresponding to the ID numbers of the stored print jobs are compared, and prioritization is determined so that a job with a shorter average picking-up period is outputted earlier. This ensures that in the case where images are to be outputted before detection of a corresponding ID number, the print jobs are outputted sequentially in a manner such that those which seem more appropriate to be outputted are outputted earlier.

As described above, a digital copying machine 1 in accordance with Example 5 can be designed so as to be composed of (i) a hard disk device 503 for storing and managing at least one print job along with ID number, (ii) a laser recording section 32 for outputting images in accordance with the print job, (iii) a permitting section (CPU 401) for checking the ID number and permitting output of a print job corresponding to the ID number through the laser recording section 32, (iv) a statistics section (hard disk device 503 and CPU 401) for managing a lapse of time since the hard disk device 503 receiving the print job until the permitting section permitting output of the print job, along with an ID number corresponding to the print job so as to make statistics, and (v) a control section (CPU 401) for, in the case where a plurality of print jobs are to be outputted, controlling an order in which the print jobs are outputted, on the basis of the statistics of each set of ID number stored in the statistics section.

This arrangement enables output of print jobs based on a past output processing state of each set of ID number, thereby ensuring that a plurality of print jobs are efficiently outputted without cessation.

In the case where a plurality of sets of ID number and print jobs are detected by the permitting section, the foregoing control section controls an order in which the print jobs are outputted, based on the statistics information managed by the statistics section. This ensures that the print jobs are outputted on the basis of a past output processing state of each set of ID number. Therefore, in the case where output of a plurality of print jobs is instructed, priority is appropriately imparted to print jobs in outputting, thereby ensuring efficient output of a plurality of print jobs without cessation.

Furthermore, in the case where a quantity of data stored in the hard disk device 503 reaches a predetermined level, the foregoing control section controls an order in which the print jobs are outputted, on the basis of the statistics information managed by the statistics section. This ensures that the print jobs are outputted on the basis of a past output processing state of each set of ID number. Therefore, in the case where output of a plurality of print jobs is instructed, priority is appropriately imparted to print jobs in outputting, thereby ensuring efficient output of a plurality of print jobs without cessation. Besides, since the apparatus starts preparation for receiving a new print job output instruction (securing a processing region) when a quantity of data stored in the recording device reaches a predetermined level, a new instruction is by no means rejected, and all print jobs are surely processed.

EXAMPLE 6

A digital copying machine 1 in accordance with Example 6 is designed so as to (i) manage data on past picking-up periods (period since reception of a print job until detection of a corresponding ID number) regarding each ID number as statistical information, and (ii) output the print job at a timing determined on the basis of past detection (picking-up) states.

The digital copying machine 1 does not output image data corresponding to a print-out request immediately after the image data are transferred to the digital copying machine 1, but temporarily stores the same in the hard disk device 503 therein. At the same time, a time at which the image data are inputted to the digital copying machine 1 is recorded as reception time. Then, the received print job is outputted at a predetermined timing. Incidentally, the timing at which a print job of an ID number which is the first print job corresponding to the ID number (i.e., having no history information) is processed is determined with relationship of the same with the other print jobs taken into consideration.

The digital copying machine 1 detects an ID card as a user holding the same approaches, reads an ID number thereof, and collates the ID number with print jobs managed therein. Here, in the case where there is a print job corresponding to the detected ID number, the digital copying machine 1 judges that the user has come to receive an outputted matter of images corresponding to the print-out request, and assuming the foregoing ID data detection time as picking-up time, stores as history information the picking-up time as well as the past states along with correspondence to the foregoing ID number.

Thus, by recording the reception and picking-up times of each print job, found is a lapse of time (hereinafter referred to as picking-up period) since a user issuing a print-out request until the user coming there to pick up the outputted matter. With this, picking-up periods as to jobs corresponding to past print-out requests are managed as statistics regarding each user, as shown in FIG. 13. From such a statistics on picking-up periods, an average of periods since issuances of print-out requests until picking-up of outputted matters (hereinafter referred to as average picking-up period) is calculated regarding each user. Based on the average picking-up period thus calculated, when a print-out request of a new job is issued by the foregoing user, an estimated time at which the user comes to pick up the outputted matter (an estimated picking-up time) can be calculated by adding the foregoing average picking-up period to the reception time of the request.

The digital copying machine 1 in accordance with Example 6 controls output of a print job based on the foregoing estimated picking-up time. More specifically, two methods are available, one wherein output of a job is started at an estimated picking-up time for the job, and the other wherein output of a job is made to finish at an estimated picking-up time for the job.

By estimating a picking-up time for a print job and outputting the same based on the estimated picking-up time, a period while an outputted matter by the printing is left at the discharge section can be shortened, and an inconvenience like mixing-up of a plurality of outputted matters left at the discharge section can be suppressed.

Incidentally, in the case where job output is started at an estimated picking-up time, the control section should only supervise whether or not it has become an estimated picking-up time for the job, starting the supervision upon issuance of a request for printing-out of a job. Therefore, efficient output processing can be executed with simple control.

In the case where job output is made to finish at an estimated picking-up time, the control section is required to calculate a period necessary for the printing-out based on the content of the job, and to issue a printing-out command by taking the foregoing period into consideration. Therefore, a load on the control section increases, but the output more likely finishes when the user comes to pick up the outputted matter, thereby enhancing the user's convenience.

Furthermore, the digital copying machine 1 executes image output processing of a print job based on the history information, and output of the print job could possibly have not yet started or finished when the user comes to pick up the outputted matter. In such a case, upon detection of an ID number, a print job corresponding to the ID number is read out from the hard disk device, and it is prioritized in output processing.

At the same time, the user is informed of the incompletion of output, and in the case where the digital copying machine 1 is in a stand-by state, the output of the corresponding print job is immediately started. Alternatively, in the case where the digital copying machine 1 is processing another print job, any other action may be taken with the output of the currently processed print job taken into consideration, for example: the output of the currently processed print job is interrupted by the foregoing print job; or the output of the foregoing print job is started immediately after output of the currently processed print job is completed.

Furthermore, by sorting and housing outputted matters of print jobs by use of a sorting device such as a sorter equipped with a plurality of housing trays so that respective outputted matters are identified with respective print jobs, it is possible for the user to easily identify (pick up) an outputted matter he/she requested.

As described above, a digital copying machine 1 in accordance with Example 6 can be designed so as to be composed of (i) a hard disk device 503 for storing and managing at least a print job along with ID number, (ii) a laser recording section 32 for outputting images in accordance with the print job, (iii) a traveling object identifying device for checking ID number and supervising picking-up of an outputted matter of the print job, (iv) a statistics section (hard disk device 503 and CPU 401) for managing a lapse of time since the hard disk device 503 receiving the print job until the traveling object identifying device detecting picking-up of an outputted matter of the print job, along with ID number corresponding to the print job, so as to make statistics, and (v) a control section (CPU 401) for controlling output processing of the print job based on the statistics about each ID number managed by the statistics section.

This ensures that print jobs are processed and outputted based on past output states about each ID number, thereby resulting in that efficient output of print jobs at appropriate timings. Further, problems like that outputted matters from the apparatus fill the discharge section, mixed up with each other with distinction therebetween becoming difficult, making it difficult to find out a target outputted matter, can be avoided.

The foregoing control section permits output of a print job through the laser recording section 32 when a lapse of time reaches time information (estimated picking-up time) managed by the statistics section. This ensures that print jobs are processed and outputted based on past output states regarding each ID number, thereby resulting in efficient output of print jobs at appropriate timings.

Alternatively, the foregoing control section completes output of a print job through the laser recording section 32 around when it becomes time information (estimated picking-up time) managed by the statistics section. This ensures that print jobs are processed and outputted based on past output states regarding each ID number, thereby ensuring efficient output of print jobs at appropriate timings.

Furthermore, upon detection of ID number, if output of a print job corresponding to the ID number detected has not yet been started, the foregoing control section immediately imparts priority to the foregoing print job in outputting. This ensures that, though print jobs are basically processed and outputted based on past output states regarding each ID number, the user, even if coming to pick up the outputted matter before the start of the output, is provided with the outputted matter on the spot, without waiting.

EXAMPLE 7

A digital copying machine 1 in accordance with Example 7 is designed so as to, in response to an instruction for a scanner mode for transmitting original document images to an external apparatus in a network environment, controls transmission of inputted image information, in accordance with a user's ID number.

In Example 7, personal computers which users use are respectively identified with the users, and the digital copying machine 1 manages the user's ID numbers and addresses of the personal computers that the users use, along with correspondence therebetween, in the hard disk device (transmission destination ID storing section) 503. When one user attempts to have an original document read by the scanner section (reading section) 31 of the digital copying machine 1 and have the read image data transmitted to the user's personal computer, the digital copying machine 1 checks the user's ID number from the user's ID card, and transmits the image data to a personal computer whose address is stored along with correspondence to the ID number. This allows the user to omit, for example, instruction of a personal computer as transmission destination by inputting through the manipulation panel in the scanner mode, thereby improving operability. Incidentally, the image data transmission control in Example 7 is executed by the CPU 401, and the foregoing CPU 401 is equivalent to a transmission control section set forth in claims.

Furthermore, upon transmission of image data read out of an original document by the scanner section 31 to an external apparatus such as a personal computer, the digital copying machine 1 transmits an ID number read out of a user's ID card, together. This aims to, in the case where a plurality of users are registered with one and same personal computer as transmission destination, enable the personal computer side to check which user's transmission of images it is.

Furthermore, upon transmission of image data read out of an original document by the scanner section 31 to a personal computer, the foregoing digital copying machine 1 confirms a transmission destination of image information based on a user's ID number read out of an ID card and displays the thus confirmed information about the transmission destination on the display panel or the like. This enables the user to check the automatically confirmed transmission destination of the image information, thereby preventing transmission to a wrong destination.

Incidentally, if the copying machine set a wrong transmission destination, an ID number of a user who has requested transmission of an original document is not read out (because the user does not have an ID card with him/herself, etc.), and an ID number of another user who is nearby by chance is possibly read instead.

Furthermore, the digital copying machine 1 is arranged so as to have a first transmission destination determining mode in which a transmission destination of image information is determined based on a user's ID number read out from an ID card, and a second transmission destination determining mode in which an instructed transmission destination is selected as the transmission destination of image information, and the user is allowed to freely choose either of these transmission destination determining modes.

This aims to, since there are cases where the user wants to send image data of an original document read by the scanner section 31 to the third party, meet such requests by the second transmission destination determining mode. In such a case where the user does not have his/her ID card, transmission of image data in the second transmission destination determining mode is possible.

The digital copying machine 1 is further arranged so that, in the case where the digital copying machine 1 detects a plurality of ID numbers at the same time, all the transmission destinations corresponding to the ID number are displayed on the display panel or the like so that one of them can be selected and determined by input of selection by the user.

Upon read-in by the scanner section 31, the digital copying machine 1 does not immediately transmit the original document data but temporarily stores the same along with correspondence to the ID number. When the user who made the scanner section 31 read in the data issues a transmission request with use of an external apparatus such as a personal computer so as to transmit the data to the external apparatus, the digital copying machine 1 checks the ID number and transmits the image data to the external apparatus from which the user sent the request.

This aims to, in such a case where a plurality of users share one personal computer, make the digital copying machine 1 have a protect function for preventing the image data from being viewed by another user. Besides, the original document images may be managed along with correspondence to a user's ID number who set the original document and transmitted according to the ID number, so that transmission of the original document images to a wrong apparatus can be prevented.

Further, upon read-in by the scanner section 31, the digital copying machine 1 stores the read-in original document image data in a memory section such as the hard disk device 503. Then, when an ID card holding the ID number becomes no longer detected, the ID number is determined as the ID number to be stored together with the original document image data.

This aims to automatically recognize that the user had the original document images read in and took away the document, and to manage the ID number together with the original document images.

This makes the digital copying machine 1 judge that there is no more original document images to read in and automatically end the original document reading-in (inputting) mode, thereby enhancing operability for users.

Furthermore, upon read-in by the scanner section 31, the foregoing digital copying machine 1 stores the read-in original document image data in a memory section such as the hard disk device 503. Then, when an ID card holding the ID number becomes no longer detected, the digital copying machine 1 determines the ID number as the ID number to be stored together with the original document image data, and thereafter, transmits the information thus managed to a transmission destination apparatus corresponding to the ID number.

This makes the digital copying machine 1 judge that there is no more original document images to read in, and automatically determine a transmission destination according to the ID number, thereby enhancing operability for users.

Furthermore, upon read-in by the scanner section 31, the foregoing digital copying machine 1 stores the readin original document image data in a memory section such as the hard disk device 503. Then, in the case where the digital copying machine 1 detects a plurality of ID numbers at the same time, an ID number which thereafter (immediately) becomes no longer detected is selected from thereamong and determined as the ID number to be stored together with the original document image data.

This ensures that, with a plurality of users near the apparatus, read-in image information can be managed together with an appropriate ID number.

EXAMPLE 8

Figure 14:
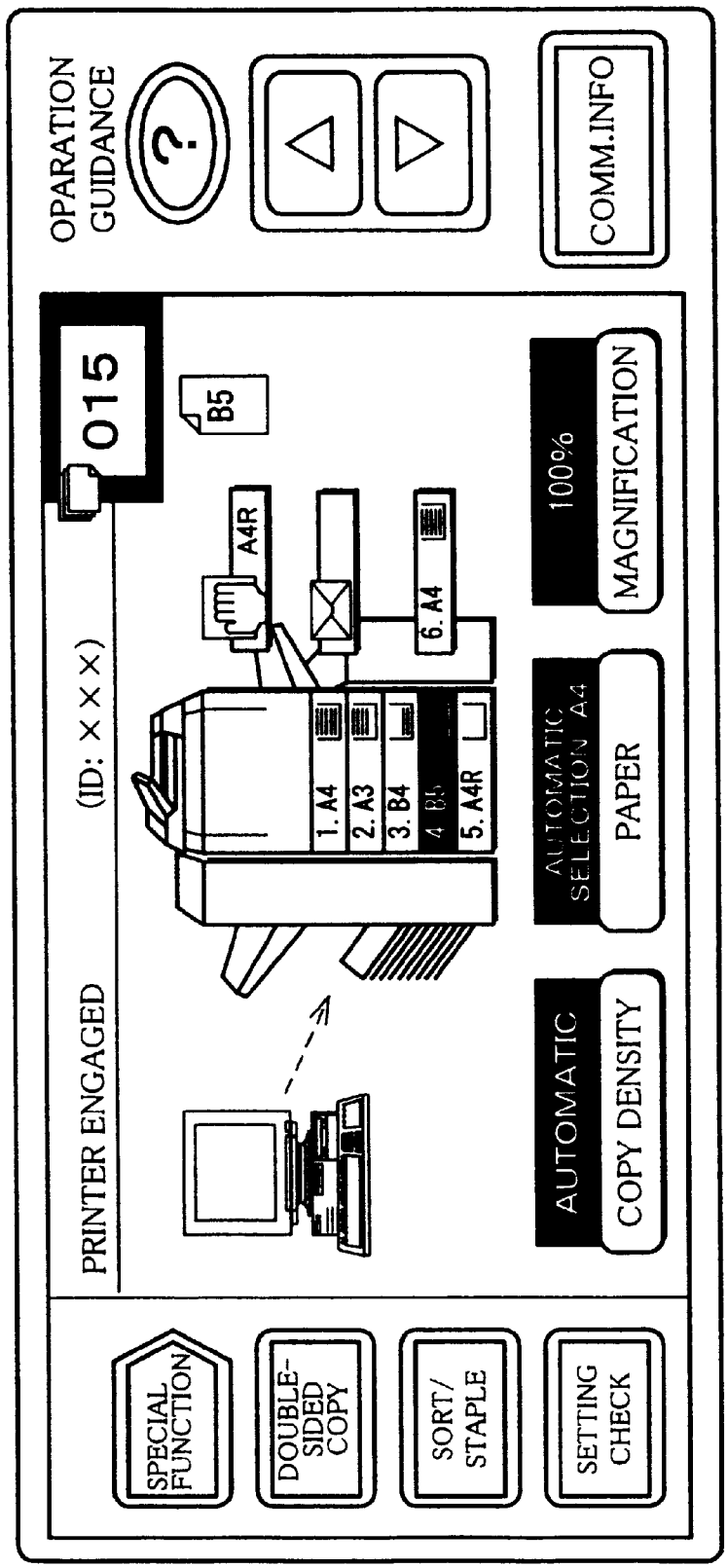
FIG. 14 is an explanatory view illustrating a display on a digital copying machine in accordance with Example 8, which shows a state of a printing operation in progress.

A digital copying machine 1 in accordance with Example 8 is designed as follows: regarding image data being printed out by the laser recording section 32, in the case where the user who inputted the foregoing image data is in front of the digital copying machine 1 (in a control area thereof) (that is, a user's ID number detected by the traveling object identifying device coincides with the ID number stored along with correspondence to the foregoing image data), the digital copying machine 1 displays a state of the printing operation in progress on the LCD display section 104 of the manipulation panel 103, in a display manner as shown in FIG. 14.

Figure 15:
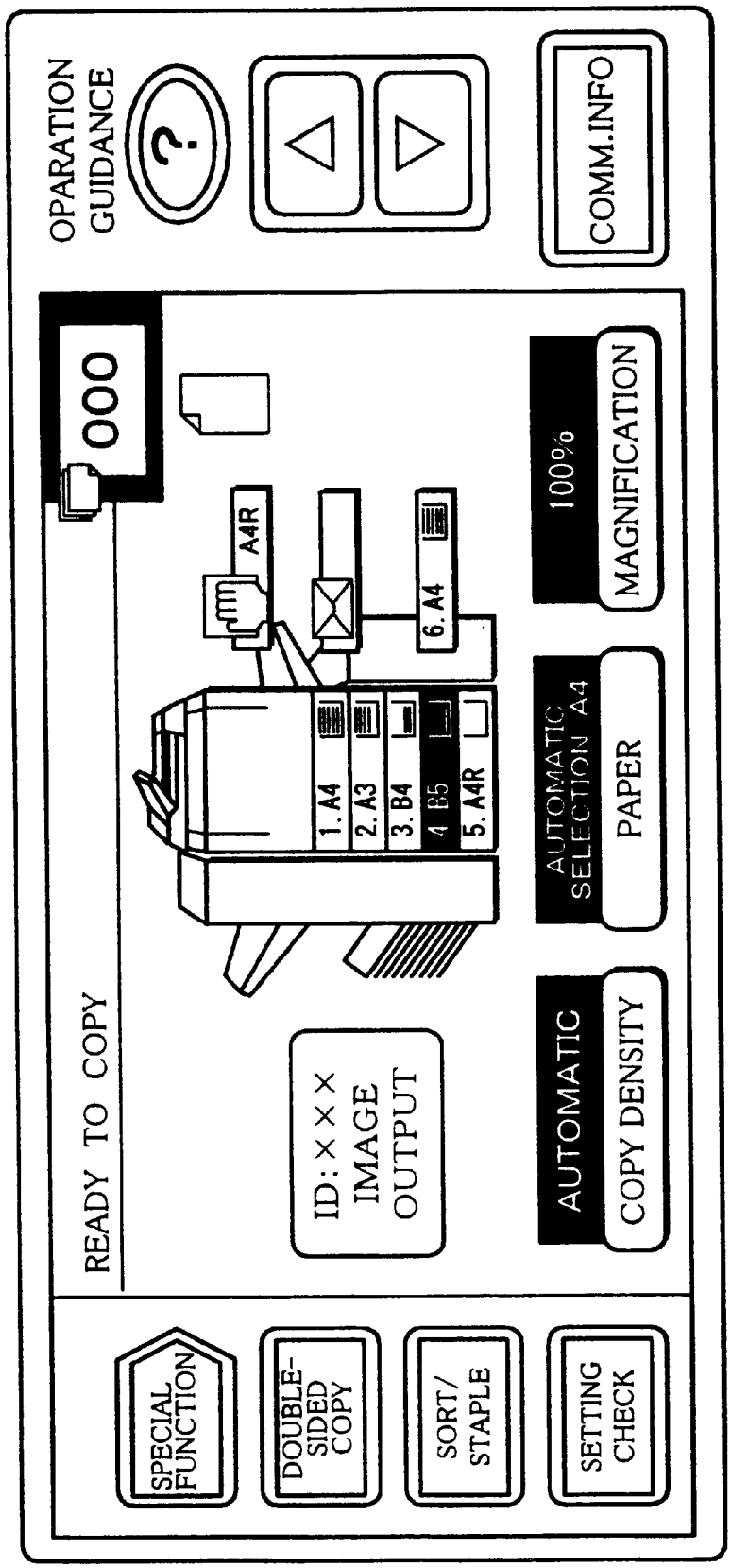
FIG. 15 is an explanatory view illustrating a display on the foregoing digital copying machine, which shows that the machine is available to accept new image data.

Further, in the case where the user in front of the digital copying machine 1 is not the user who inputted the foregoing image data (that is, the user's ID number detected by the traveling object identifying device does not coincide with the ID number stored along with correspondence to the foregoing image data), the LCD display section 104 has a display indicating that the apparatus is available to accept input of new image data, in a display manner as shown in FIG. 15.

In the case where, however, during the printing operation by the laser recording section 32 the user who inputted the image data being printed out goes away from the apparatus, the display of a state of the printing operation on the LCD display section 104 becomes unnecessary. Therefore, if the scanner section 31 is in a stand-by state, the display of the LCD display section 104 switches to a display in the manner as shown in FIG. 15, so as to indicate that the apparatus is available to accept input of new image data.

The display in the manner as shown in FIG. 15 tells that the apparatus is available to accept input of new image data, as well as, at a part of the display area, that the laser recording section 32 is currently executing a printing operation.

Furthermore, the LCD display section 104 may be divided so as to have a display area for telling that the apparatus is available to accept input of new image data, as well as a display area for displaying a state of the printing operation in progress, at the same time. In the case where thus both the stand-by state of the scanner section 31 and the state of the printing operation in progress are displayed simultaneously, the proportion of the two display areas may be changed depending on presence/absence of the user before the apparatus.

Concerning image data being printed out by the laser recording section 32, in the case where a user who inputted the image data goes away from the apparatus, the display switches to a display state telling that the apparatus is available to accept input of new image data (see FIG. 15) as described above. When the user returns to the apparatus and the user's ID number is detected, the display in the foregoing state switches back to the display showing the state of the printing operation in progress (see FIG. 14).

Figure 16:
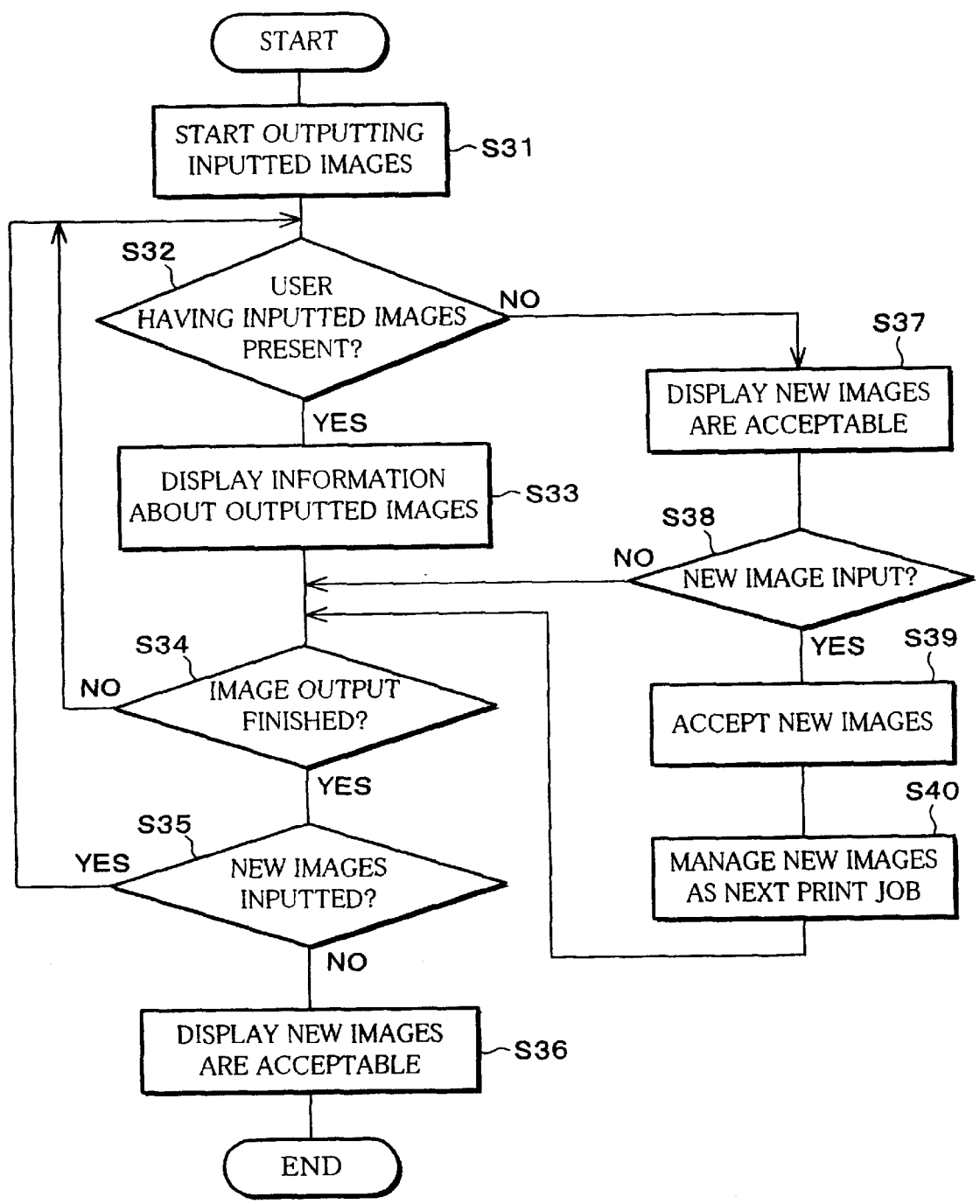
FIG. 16 is a flowchart of an operation of a digital copying machine in accordance with Example 8.

The foregoing process is described below, with reference to a flowchart of FIG. 16.

First of all, when printing-out output of inputted image data starts (S31), whether or not a user who inputted the image data is near the digital copying machine 1 is judged by detection of the user's ID card (S32). In the case where the user is at the digital copying machine 1, a state of an operation in progress, i.e., printing-out of image data through the LCD display section 104, is displayed (see FIG. 14) to the user (S33). Then, at S34, whether or not the foregoing image data printing operation has finished is judged, and in the case where it is judged to have finished, presence/absence of newly inputted image data is judged (S35). In the case where there are no newly inputted image data, the display of the LCD display section 104 is switched to a display state telling that the apparatus is available to accept input of new image data (see FIG. 15), and the apparatus becomes in a stand-by state.

In the case where that the user having inputted data is not at the apparatus is confirmed when the operation of printing out the image data inputted at S32 starts, or in the case where the user goes away from the apparatus and the presence of the user becomes no longer detected while the printing operation is judged at S34 not to have finished and the process of the loop of S32 to S34 is continuously executed, the display of the LCD display section 104 is switched to a display state telling that the apparatus is available to accept input of new image data (see FIG. 15) (S37). Then, whether or not image data are newly inputted is judged (S38), and in the case where no image data are newly inputted, the flow goes to S34, followed by the same operation as described above.

In the case where image data are newly inputted at S38, the newly inputted image data are accepted (S39), and the image data are temporarily stored in the hard disk device or the like and managed as next printing-out output (print job) (S40). Then, the flow goes to S34, followed by the same operation as described above.

By thus switching the display of the LCD display section 104 depending on presence/absence of a user who has inputted image data, the user is allowed to easily check a state of a printing operation in progress, and a state in which a printing operation is being executed but the apparatus is available to accept next input of image data.

As described above, a digital copying machine 1 in accordance with Example 8 can be designed so as to be composed of (i) an LCD display section 104 for displaying information about output of images in accordance with inputted image data, (ii) an traveling object identifying device for checking presence of a user who has inputted the image data, and (iii) a display control section for controlling a display of the LCD display section 104 according to result of checking of presence/absence of the user by the traveling object identifying device.

Upon detection of presence of a user by the traveling object identifying device, the display of the LCD display section 104 is switched so as to display a state of an image outputting operation in accordance with inputted image data. This ensures that a suitable display is provided to the user, thereby preventing the user from getting confused.

Besides, when presence of the user having inputted image data becomes no longer detected by the traveling object identifying device, the foregoing display control section switches the display of the LCD display section 104 so as to tell that input of new image data is permitted. This makes it possible to easily inform other users that input of new image data is permitted though the already inputted image data are being outputted. As a result, it is possible to eliminate an inconvenience like that, in spite of that input of new image data is permitted, another user unnecessarily remains waiting without using the apparatus until the outputting operation now in progress finishes. Thus, making the user confused is prevented, and efficiency of use of the apparatus is enhanced.

Furthermore, the foregoing display control section controls the switching of the display of the LCD display section 104 so that, when presence of the user having inputted image data becomes no longer detected by the traveling object identifying device, a display that input of new image data is permitted is mainly shown. For example, a display telling that input of new image data is permitted is shown, but the same display includes, in a part of the same, a display telling that previously inputted image data are being outputted. Thus, it easily let the user know that input of new image data is permitted, though the previously-inputted image data are being outputted.

Furthermore, when presence of the user having inputted image data is again detected by the traveling object identifying device, the foregoing display control section switches the display of the LCD display section 104 so as to display information about the image data inputted by the user. This enables the user to easily check a state of an operation of outputting the image data, without specific manipulation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image output processing apparatus, comprising:
   an image data input section for receiving image data supplied from an external apparatus;
   an image recording section for recording an image on a sheet of paper in accordance with the image data inputted through said image data input section;
   a storing and managing section for, upon input of image data through said image data input section, storing and managing the image data along with correspondence to a specific ID number;
   a traveling object identifying section having an interrogator provided in a main body of said image output processing apparatus, and a plurality of responders each of which stores a specific ID number and is capable of wireless communication with said interrogator within a control area of said interrogator, said traveling object identifying section being designed so that, when one of said responders enters the control area of said interrogator, the ID number stored in said responder is detected and checked by said interrogator; and
   a display section for, when an ID number is detected by said traveling object identifying device, in the case where image data corresponding to the ID number are stored in said storing and managing section, displaying information about the image data, wherein:
      said display section displays at least an output processing time of the image data as the information about the image data.

2. The image output processing apparatus as set forth in claim 1, wherein:
   in the case where said storing and managing section stores not less than two sets of image data corresponding to the ID number detected by said traveling object identifying section, said display section lists up and displays information about all the sets of image data corresponding to the detected ID number.

3. The image output processing apparatus as set forth in claim 1, wherein:
   in the case where said storing and managing section stores at least one set of image data corresponding to the ID number detected by said travelling object identifying section, when said image recording section has a defect and is incapable of recording the image data, said display section has a display informing, as information about the image data, that said image recording section has the defect in outputting the image data.

4. The image output processing apparatus as set forth in claim 1, further comprising:
   a selecting section for inputting selection regarding image data, said selecting section being designed so that, in the case where said storing and managing section stores at least one set of image data corresponding to the ID number detected by said travelling object identifying section and said display section displays information about all the sets of image data stored in said storing and managing section, a certain set of image data is freely selected from among the sets of image data displayed by said display section and is inputted through said selecting section; and
   a permitting section for permitting output of the image data selected by said selecting section.

5. The image output processing apparatus as set forth in claim 1, further comprising:
   a selecting section for inputting selection regarding image data, said selecting section being designed so that, in the case where said storing and managing section stores at least one set of image data corresponding to the ID number detected by said travelling object identifying section and said display section displays information about all the sets of image data stored in said storing and managing section, a certain set of image data is freely selected from among the sets of image data displayed by said display section and is inputted through said selecting section; and
   an output cancelling section for cancelling output of the image data selected by said selecting section.

6. An image output processing apparatus, comprising:
   an image data input section for receiving image data supplied from an external apparatus;
   an image recording section for recording an image on a sheet of paper in accordance with the image data inputted through said image data input section;
   a storing and managing section for, upon input of image data through said image data input section, storing and managing the image data along with correspondence to a specific ID number; and
   a traveling object identifying section having an interrogator provided in a main body of said image output processing apparatus, and a plurality of responders each of which stores a specific ID number and is capable of wireless communication with said interrogator within a control area of said interrogator, said traveling object identifying section being designed so that, when one of said responders enters the control area of said interrogator, the ID number stored in said responder is detected and checked by said interrogator, wherein:
      said image recording section has a first output processing mode in which, in response to detection of an ID number by said traveling object identifying section, output is started according to the detected ID number, and a second output processing mode in which output is started at a predetermined timing; and
      said image recording section is capable of receiving a signal for instruction of selecting one from among the output processing modes.

7. An image output processing apparatus, comprising:
   an image data input section for receiving image data supplied from an external apparatus;
   an image recording section for recording an image on a sheet of paper in accordance with the image data inputted through said image data input section;
   a storing and managing section for, upon input of image data through said image data input section, storing and managing the image data along with correspondence to a specific ID number; and
   a traveling object identifying section having an interrogator provided in a main body of said image output processing apparatus, and a plurality of responders each of which stores a specific ID number and is capable of wireless communication with said interrogator within a control area of said interrogator, said traveling object identifying section being designed so that, when one of said responders enters the control area of said interrogator, the ID number stored in said responder is detected and checked by said interrogator;
   a lapse of time managing section for, regarding each set of image data supplied from an external apparatus, managing a lapse of time since input of the image data; and an output control section for controlling output of image data stored in said storing and managing section, wherein, when an ID number is detected by said traveling object identifying section, in the case where a plurality of sets of image data corresponding to the ID number are stored in said recording and managing section, the output is controlled on the basis of lapses of time of the sets of image data managed by said lapse of time managing section.

8. The image output processing apparatus as set forth in claim 7, wherein:

when an ID number is detected by said traveling object identifying section, in the case where sets of image data corresponding to the ID number are stored in said recording and managing section, said output control section selects, from among the sets of image data corresponding to the detected ID number, the sets of image data whose lapses of time since input of the same, managed by said lapse of time managing section, do not exceed a predetermined period, and outputs the selected sets of image data in an order in which they were inputted.

9. The image output processing apparatus as set forth in claim 7, wherein:

when an ID number is detected by said traveling object identifying section, in the case where sets of image data corresponding to the ID number are stored in said recording and managing section, said output control section selects, from among the sets of image data corresponding to the ID number, a set of image data which was received not less than a predetermined period behind a time of reception of a set of image data first received, and prioritizes the selected set of image data in outputting.

10. The image output processing apparatus as set forth in claim 7, wherein:

when an ID number is detected by said traveling object identifying section, in the case where sets of image data corresponding to the ID number are stored in said recording and managing section, said output control section selects, from among the sets of image data corresponding to the detected ID number, the sets of image data whose lapses of time since input of the same, managed by said lapse of time managing section, exceed a predetermined period, and puts the selected sets of image data in a waiting state, suspending output of the same.

11. The image output processing apparatus as set forth in claim 7, wherein:

when an ID number is detected by said traveling object identifying section, in the case where sets of image data corresponding to the ID number are stored in said recording and managing section, if some of the same are ready to be outputted and the others are not, said output control section selects, from among the sets of image data corresponding to the detected ID number, the sets of image data ready to be outputted and prioritizes the same in outputting.

12. An image output processing apparatus, comprising:

an image data input section for receiving image data supplied from an external apparatus;

an image recording section for recording an image on a sheet of paper in accordance with the image data inputted through said image data input section;

a storing and managing section for, upon input of image data through said image data input section, storing and managing the image data along with correspondence to a specific ID number;

a traveling object identifying section having an interrogator provided in a main body of said image output processing apparatus, and a plurality of responders each of which stores a specific ID number and is capable of wireless communication with said interrogator within a control area of said interrogator, said traveling object identifying section being designed so that, when one of said responders enters the control area of said interrogator, the ID number stored in said responder is detected and checked by said interrogator; and an output control section for, when an ID number is detected by said traveling object identifying section, in the case where image data corresponding to the ID number are stored in said recording and managing section, controlling output of image data stored and managed by said storing and managing section, wherein:

in the case where during an output of image data another ID number is detected by said traveling object identifying section, said output control section prepares output of image data corresponding to the newly detected ID number, while executing the current output operation.

13. The image output processing apparatus as set forth in claim 12, wherein:

in the case where during an output of image data another ID number is detected by said traveling object identifying section, said output control section develops image data corresponding to the newly detected ID number, while executing the current output operation.

14. The image output processing apparatus as set forth in claim 12, wherein:

in the case where during an output of image data another ID number is detected by said traveling object identifying section, said output control section checks whether or not said image recording section is available to output image data corresponding to the newly detected ID number, and if said image recording section has a defect, said output control section informs it.

15. An image output processing apparatus, comprising:

an image data input section for receiving image data supplied from an external apparatus;

an image recording section for recording an image on a sheet of paper in accordance with the image data inputted through said image data input section;

a storing and managing section for, upon input of image data through said image data input section, storing and managing the image data along with correspondence to a specific ID number;

a traveling object identifying section having an interrogator provided in a main body of said image output processing apparatus, and a plurality of responders each of which stores a specific ID number and is capable of wireless communication with said interrogator within a control area of said interrogator, said traveling object identifying section being designed so that, when one of said responders enters the control area of said interrogator, the ID number stored in said responder is detected and checked by said interrogator; and an output control section for, when an ID number is detected by said traveling object identifying section, in the case where image data corresponding to the ID number are stored in said recording and managing section, controlling output of image data stored and managed by said storing and managing section, wherein:

in the case where during an output of image data another ID number is detected by said traveling object identifying section, said output control section determines which set of image data, among the sets of image data including the set of image data being currently processed and the set of image data corresponding to the newly detected ID number, should be prioritized in outputting.

16. An image output processing apparatus, comprising:

an image data input section for receiving image data supplied from an external apparatus;

an image recording section for recording an image on a sheet of paper in accordance with the image data inputted through said image data input section;

a storing and managing section for, upon input of image data through said image data input section, storing and managing the image data along with correspondence to a specific ID number;

a traveling object identifying section having an interrogator provided in a main body of said image output processing apparatus, and a plurality of responders each of which stores a specific ID number and is capable of wireless communication with said interrogator within a control area of said interrogator, said traveling object identifying section being designed so that, when one of said responders enters the control area of said interrogator, the ID number stored in said responder is detected and checked by said interrogator; and an output control section for, when an ID number is detected by said traveling object identifying section, in the case where image data corresponding to the ID number are stored in said recording and managing section, controlling output of image data stored and managed by said storing and managing section, wherein:

in the case where during an output of image data another ID number is detected by said traveling object identifying section, said output control section prioritizes a set of image data corresponding to the newly detected ID number, provided that the ID number corresponding to the image data being currently outputted is not detected at the detection of the new ID number.

17. An image output processing apparatus, comprising:

an image data input section for receiving image data supplied from an external apparatus;

an image recording section for recording an image on a sheet of paper in accordance with the image data inputted through said image data input section;

a storing and managing section for, upon input of image data through said image data input section, storing and managing the image data along with correspondence to a specific ID number;

a traveling object identifying section having an interrogator provided in a main body of said image output processing apparatus, and a plurality of responders each of which stores a specific ID number and is capable of wireless communication with said interrogator within a control area of said interrogator, said traveling object identifying section being designed so that, when one of said responders enters the control area of said interrogator, the ID number stored in said responder is detected and checked by said interrogator; and an output control section for, when an ID number is detected by said traveling object identifying section, in the case where image data corresponding to the ID number are stored in said recording and managing section, controlling output of image data stored and managed by said storing and managing section, wherein:

said image output processing apparatus has at least one operation mode, in addition to a printer mode for receiving image data supplied from an external apparatus and outputting an image on a sheet of paper based on the image data; and in the case where, before output of image data in the printer mode is started, an instruction relating to a processing operation in another mode is detected, said output control section temporarily suspends the output of image data in the printer mode and prioritizes the output processing operation in the instructed mode.

18. The image output processing apparatus as set forth in claim 17, wherein:

in the case where, before output of image data in the printer mode is started, an instruction relating to a processing operation in a mode other than the printer mode is detected, said output control section executes a processing operation in the instructed mode, and informs presence of a print job to be outputted.

19. The image output processing apparatus as set forth in claim 17, wherein:

in the case where, before output of image data in the printer mode is started, an instruction relating to a processing operation in a mode other than the printer mode is detected, said output control section executes a processing operation in the instructed mode, and thereafter starts the output of the image data at a stage where an instruction for the same is detected.

20. An image output processing apparatus, comprising:

an image data input section for receiving image data supplied from an external apparatus;

an image recording section for recording an image on a sheet of paper in accordance with the image data inputted through said image data input section;

a storing and managing section for, upon input of image data through said image data input section, storing and managing the image data along with correspondence to a specific ID number;

a traveling object identifying section having an interrogator provided in a main body of said image output processing apparatus, and a plurality of responders each of which stores a specific ID number and is capable of wireless communication with said interrogator within a control area of said interrogator, said traveling object identifying section being designed so that, when one of said responders enters the control area of said interrogator, the ID number stored in said responder is detected and checked by said interrogator;

a statistics information managing section for statistically managing a picking-up period since reception of image data until detection of an ID number corresponding to the image data by said traveling object identifying section, and managing an average of the picking-up periods as an average picking-up period regarding each ID number; and an output control section for, when an ID number is detected by said traveling object identifying section, in the case where image data corresponding to the ID number are stored in said recording and managing section, controlling output of image data stored and managed by said storing and managing section, wherein:

when a plurality of image data are to be outputted, said output control section controls an order in which the image data are outputted, based on average picking-up periods thereof stored in said statistics information managing section.

21. An image output processing apparatus, comprising:

an image data input section for receiving image data supplied from an external apparatus;

an image recording section for recording an image on a sheet of paper in accordance with the image data inputted through said image data input section;

a storing and managing section for, upon input of image data through said image data input section, storing and managing the image data along with correspondence to a specific ID number;

a traveling object identifying section having an interrogator provided in a main body of said image output processing apparatus, and a plurality of responders each of which stores a specific ID number and is capable of wireless communication with said interrogator within a control area of said interrogator, said traveling object identifying section being designed so that, when one of said responders enters the control area of said interrogator, the ID number stored in said responder is detected and checked by said interrogator;

a statistics information managing section for statistically managing a picking-up period since reception of image data until detection of an ID number corresponding to the image data by said traveling object identifying section, and managing an average of picking-up periods as an average picking-up period regarding each ID number; and an output control section for controlling output of image data based on average picking-up periods stored in said statistics information managing section when a quantity of data stored in said storing and managing section reaches a predetermined level.

22. An image output processing apparatus, comprising:

an image data input section for receiving image data supplied from an external apparatus;

an image recording section for recording an image on a sheet of paper in accordance with image data inputted through said image data input section;

a storing and managing section for, upon input of image data through said image data input section, storing and managing the image data along with correspondence to a specific ID number;

a traveling object identifying section having an interrogator provided in a main body of said image output processing apparatus, and a plurality of responders each of which stores a specific ID number and is capable of wireless communication with said interrogator within a control area of said interrogator, said traveling object identifying section being designed so that, when one of said responders enters the control area of said interrogator, the ID number stored in said responder is detected and checked by said interrogator;

a statistics information managing section for statistically managing a picking-up period since reception of image data until detection of an ID number corresponding to the image data by said traveling object identifying section, and managing an average of picking-up periods an average picking-up period as well as an estimated picking-up time regarding each ID number, the estimated picking-up time being calculated by adding, to an input time of inputted image data, an average picking-up period corresponding to the inputted image data; and an output control section for controlling a timing of output of image data based on the estimated picking-up time managed by said statistics information managing section.

23. The image output processing apparatus as set forth in claim 22, wherein:

said output control section causes the output of the image data to start when it becomes the estimated picking-up time managed by said statistics information managing section.

24. The image output processing apparatus as set forth in claim 22, wherein:

said output control section controls a time at which the output of the image data is started, so that the output of the image data finishes when it becomes the estimated picking-up time managed by said statistics information managing section.

25. The image output processing apparatus as set forth in claim 22, wherein:

in the case where, when a certain ID number is detected by said traveling object identifying section, in the case where output of image data corresponding to the ID number detected has not yet started, said output control section prioritizes the output of the image data in outputting.

26. An image output processing apparatus, comprising:

a reading section for reading in an original document to obtain image data of the same;

a transmitting section for transmitting the image data obtained by said reading section, to an external apparatus;

a traveling object identifying section having an interrogator provided in a main body of said image output processing apparatus, and a plurality of responders each of which stores a specific ID number and is capable of wireless communication with said interrogator within a control area of said interrogator, said traveling object identifying section being designed so that, when one of said responders enters the control area of said interrogator, the ID number stored in said responder is detected and checked by said interrogator;

a storing and managing section for, upon reading of an original document by said reading section, storing and managing image data obtained through the reading, and an ID number detected by said traveling object identifying section, along with correspondence therebetween; and a transmission control section for, in transmitting the image data obtained by said reading section to an external apparatus, controlling transmission of the image data according to the ID number stored and managed by said storing and managing section.

27. The image output processing apparatus as set forth in claim 26, further comprising:

a transmission destination ID storing section for storing external apparatuses as transmission destinations to which the image data obtained by said reading section are to be transmitted by said transmitting section, and ID numbers of said external apparatuses, the ID numbers being respectively set for said external apparatuses, wherein:

upon transmission of the image data to an external apparatus, said transmission control section selects an external apparatus having the same ID number as that stored in said storing and managing section as corresponding to the image data, according to information stored in said transmission destination ID storing section, and transmits the image data to the selected external apparatus as transmission destination of the image data.

28. The image output processing apparatus as set forth in claim 26, wherein:

upon transmission of the image data to an external apparatus, said transmission control section transmits an ID number corresponding to the image data together, to the external apparatus as transmission destination.

29. The image output processing apparatus as set forth in claim 26, wherein:

upon transmission of the image data to an external apparatus, when selecting an external apparatus having the same ID number as that stored in said storing and managing section as corresponding to the image data, according to information stored in said transmission destination ID storing section, said transmission control section informs the selected transmission destination.

30. The image output processing apparatus as set forth in claim 26, wherein:

in addition to a transmission mode in which a transmission destination of the image data is selected according the ID number, said transmission control section has another transmission mode in which a desired external apparatus can be set as transmission destination according to an instruction inputted by the user.

31. The image output processing apparatus as set forth in claim 26, wherein:

in the case where a plurality of ID numbers are detected by said traveling object identifying section when the image data obtained by said reading section are to be transmitted by said transmitting section to an external apparatus, said transmission control section has all transmission destinations corresponding to the detected ID numbers displayed to the user, and determines the transmission destination to which the image data are to be transmitted, according to selection inputted by the user.

32. The image output processing apparatus as set forth in claim 26, wherein:

said transmitting section is capable of transmitting image data in response to an image data transmission request from an external apparatus, and in transmitting image data in response to the transmission request, said transmitting section transmits image data exclusively when an ID number of the external apparatus having made the request agrees with an ID number of the image data requested.

33. The image output processing apparatus as set forth in claim 26, wherein:

at the time when an ID number which has been detected by said traveling object identifying section during reading of the original document by said reading section becomes no longer detected, said storing and managing section determines the ID number thus no longer detected, as the ID number to be stored along with correspondence to the image data read in.

34. The image output processing apparatus as set forth in claim 26, wherein:

in the case where a plurality of ID numbers are detected by said traveling object identifying section during reading of the original document by said reading section, said storing and managing section determines, among these ID numbers, an ID number which first becomes no longer detected, as the ID number to be stored along with correspondence to the image data read in.

35. An image output processing apparatus, comprising:

an image data input section for receiving image data supplied from an external apparatus;

an image recording section for recording an image on a sheet of paper in accordance with image data inputted through said image data input section;

a storing and managing section for, upon input of image data through said image data input section, storing and managing the image data along with correspondence to a specific ID number;

a traveling object identifying section having an interrogator provided in a main body of said image output processing apparatus, and a plurality of responders each of which stores a specific ID number and is capable of wireless communication with said interrogator within a control area of said interrogator, said traveling object identifying section being designed so that, when one of said responders enters the control area of said interrogator, the ID number stored in said responder is detected and checked by said interrogator;

a display section for displaying information about the image data, wherein when an ID number is detected by said traveling object identifying section, in the case where image data corresponding to the ID number are stored in said recording and managing section, said display section displays information about the image data; and a display control section for controlling a display state of said display section in accordance with a result of the ID number checking by said traveling object identifying section, wherein:

when presence of the ID number becomes no longer detected by said traveling object identifying section during recording of image data by said image recording section, said display control section switches the display state of said display section into a state of displaying permission of input of new image data.

36. The image output processing apparatus as set forth in claim 35, wherein:

when presence of the ID number becomes no longer detected by said traveling object identifying section during recording of image data by said image recording section, said display control section switches the display state of said display section into a state in which a part of the display tells that image data is being recorded, while a main part of the display tells that input of new image data is permitted.

37. The image output processing apparatus as set forth in claim 35, wherein:

when presence of an ID number corresponding to the image data being recorded is detected by said traveling object identifying section during the recording of the image data in said image recording section, said display control section switches the display state of said display section into a state of displaying information about the image data.

38. An image output processing apparatus, comprising:

image data input means for receiving image data supplied from an external apparatus;

image recording means for recording an image on a sheet of paper in accordance with the image data inputted through said image data input means;

storing and managing means for, upon input of image data through said image data input means, storing and managing the image data along with correspondence to a specific ID number;

traveling object identifying means having an interrogator provided in a main body of said image output processing apparatus, and a plurality of responders each of which stores a specific ID number and is capable of wireless communication with said interrogator within a control area of said interrogator, said traveling object identifying means being designed so that, when one of said responders enters the control area of said interrogator, the ID number stored in said responder is detected and checked by said interrogator; and display means for, when an ID number is detected by said traveling object identifying means, in the case where image data corresponding to the ID number are stored in said storing and managing means, displaying information about the image data, wherein:

display means displays at least an output processing period as the information about the image data.

39. An image output processing apparatus, comprising:

image data input means for receiving image data supplied from an external apparatus;

image recording means for recording an image on a sheet of paper in accordance with the image data inputted through said image data input means;

storing and managing means for, upon input of image data through said image data input means, storing and managing the image data along with correspondence to a specific ID number; and traveling object identifying means having an interrogator provided in a main body of said image output processing apparatus, and a plurality of responders each of which stores a specific ID number and is capable of wireless communication with said interrogator within a control area of said interrogator, said traveling object identifying means being designed so that, when one of said responders enters the control area of said interrogator, the ID number stored in said responder is detected and checked by said interrogator;

lapse of time managing means for, regarding each set of image data supplied from an external apparatus, managing a lapse of time since input of the image data; and output control means for controlling output of image data stored in said storing and managing means, wherein, when an ID number is detected by said traveling object identifying means, in the case where a plurality of sets of image data corresponding to the ID number are stored in said recording and managing means, the output is controlled on the basis of lapses of time managed by said lapse of time managing means regarding the sets of image data.

40. An image output processing apparatus, comprising:

image data input means for receiving image data supplied from an external apparatus;

image recording means for recording an image on a sheet of paper in accordance with the image data inputted through said image data input means;

storing and managing means for, upon input of image data through said image data input means, storing and managing the image data along with correspondence to a specific ID number;

traveling object identifying means having an interrogator provided in a main body of said image output processing apparatus, and a plurality of responders each of which stores a specific ID number and is capable of wireless communication with said interrogator within a control area of said interrogator, said traveling object identifying means being designed so that, when one of said responders enters the control area of said interrogator, the ID number stored in said responder is detected and checked by said interrogator; and output control means for, when an ID number is detected by said traveling object identifying means, in the case where image data corresponding to the ID number are stored in said recording and managing means, controlling output of image data stored and managed by said storing and managing means, wherein:

in the case where during an output of image data another ID number is detected by said traveling object identifying means, said output control means prepares output of image data corresponding to the newly detected ID number, while executing the current output operation.

41. An image output processing apparatus, comprising:

image data input means for receiving image data supplied from an external apparatus;

image recording means for recording an image on a sheet of paper in accordance with the image data inputted through said image data input means;

storing and managing means for, upon input of image data through said image data input, storing and managing the image data along with correspondence to a specific ID number;

traveling object identifying means having an interrogator provided in a main body of said image output processing apparatus, and a plurality of responders each of which stores a specific ID number and is capable of wireless communication with said interrogator within a control area of said interrogator, said traveling object identifying section being designed so that, when one of said responders enters the control area of said interrogator, the ID number stored in said responder is detected and checked by said interrogator; and output control means for, when an ID number is detected by said traveling object identifying means, in the case where image data corresponding to the ID number are stored in said recording and managing means, controlling output of image data stored and managed means by said storing and managing means, wherein:

said image output processing apparatus has at least one operation mode, in addition to a printer mode for receiving image data supplied from an external apparatus and outputting an image on a sheet of paper based on the image data; and in the case where, before output of image data in the printer mode is started, an instruction relating to a processing operation in another mode is detected, said output control means temporarily suspends the output of image data in the printer mode and prioritizes the output processing operation in the other mode instructed.

42. An image output processing apparatus, comprising:

image data input means for receiving image data supplied from an external apparatus;

image recording means for recording an image on a sheet of paper in accordance with the image data inputted through said image data input means;

storing and managing means for, upon input of image data through said image data input means, storing and managing the image data along with correspondence to a specific ID number;

traveling object identifying means having an interrogator provided in a main body of said image output processing apparatus, and a plurality of responders each of which stores a specific ID number and is capable of wireless communication with said interrogator within a control area of said interrogator, said traveling object identifying means being designed so that, when one of said responders enters the control area of said interrogator, the ID number stored in said responder is detected and checked by said interrogator;

statistics information managing means for statistically managing a picking-up period since reception of image data until detection of an ID number corresponding to the image data by said traveling object identifying means, and managing an average of picking-up periods as an average picking-up period regarding each ID number; and output control means for, when an ID number is detected by said traveling object identifying means, in the case where image data corresponding to the ID number are stored in said recording and managing means, controlling output of image data stored and managed by said storing and managing means, wherein:

when a plurality of image data are to be outputted, said output control means controls an order of output of the image data, based on average picking-up periods thereof stored in said statistics information managing means.

43. An image output processing apparatus, comprising:

image data input means for receiving image data supplied from an external apparatus;

image recording means for recording an image on a sheet of paper in accordance with image data inputted through said image data input means;

storing and managing means for, upon input of image data through said image data input means, storing and managing the image data along with correspondence to a specific ID number;

traveling object identifying means having an interrogator provided in a main body of said image output processing apparatus, and a plurality of responders each of which stores a specific ID number and is capable of wireless communication with said interrogator within a control area of said interrogator, said traveling object identifying means being designed so that, when one of said responders enters the control area of said interrogator, the ID number stored in said responder is detected and checked by said interrogator;

statistics information managing means for statistically managing a picking-up period since reception of image data until detection of an ID number corresponding to the image data by said traveling object identifying means, and managing an average of picking-up periods as an average picking-up period as well as an estimated picking-up time regarding each ID number, the estimated picking-up time being calculated by adding, to an input time of inputted image data, an average picking-up period corresponding to the inputted image data; and output control means for controlling a timing of output of image data based on the estimated picking-up time managed by said statistics information managing means.

44. An image output processing apparatus, comprising:

reading means for reading in an original document to obtain image data of the same;

transmitting means for transmitting the image data obtained by said reading means, to an external apparatus;

traveling object identifying means having an interrogator provided in a main body of said image output processing apparatus, and a plurality of responders each of which stores a specific ID number and is capable of wireless communication with said interrogator within a control area of said interrogator, said traveling object identifying means being designed so that, when one of said responders enters the control area of said interrogator, the ID number stored in said responder is detected and checked by said interrogator;

storing and managing means for, upon reading of an original document by said reading means, storing and managing image data obtained through the reading, and an ID number detected by said traveling object identifying means, along with correspondence therebetween; and transmission control means for, in transmitting the image data obtained by said reading means to an external apparatus, controlling transmission of the image data according to the ID number stored and managed by said storing and managing means.

45. An image output processing apparatus, comprising:

image data input means for receiving image data supplied from an external apparatus;

image recording means for recording an image on a sheet of paper in accordance with image data inputted through said image data input means;

storing and managing means for, upon input of image data through said image data input means, storing and managing the image data along with correspondence to a specific ID number;

traveling object identifying means having an interrogator provided in a main body of said image output processing apparatus, and a plurality of responders each of which stores a specific ID number and is capable of wireless communication with said interrogator within a control area of said interrogator, said traveling object identifying means being designed so that, when one of said responders enters the control area of said interrogator, the ID number stored in said responder is detected and checked by said interrogator;

display means for displaying information about the image data, wherein, when an ID number is detected by said traveling object identifying means, in the case where image data corresponding to the ID number are stored in said recording and managing means, said display means displays information about the image data; and display control means for controlling a display state of said display means in accordance with a result of the ID number checking by said traveling object identifying means, wherein:

when presence of the ID number becomes no longer detected by said traveling object identifying means during recording of image data by said image recording means, said display control means switches the display state of said display means into a state of displaying permission of input of new image data.

* * * * *